United States Patent [19]

Firey

[11] 4,455,837
[45] Jun. 26, 1984

[54] CYCLIC VELOX BOILER

[76] Inventor: Joseph C. Firey, P.O. Box 15514, Seattle, Wash. 98115

[21] Appl. No.: 546,093

[22] Filed: Oct. 27, 1983

[51] Int. Cl.³ .............................................. F01K 13/00
[52] U.S. Cl. ..................................... 60/670; 60/39.01; 122/1 C; 122/449; 122/452
[58] Field of Search ................... 122/412, 446, 448 R, 122/451 S, 451.1, 451.2, 1 C, 449, 452; 236/14; 60/670, 39.04, 39.12, 39.5, 39.01; 43/86 R, 203, 210

[56] References Cited

U.S. PATENT DOCUMENTS

| | | | |
|---|---|---|---|
| 1,913,395 | 6/1933 | Karrick | 48/203 |
| 2,225,311 | 12/1940 | Lysholm | 60/39.04 |
| 2,624,172 | 1/1953 | Houdry | 60/39.04 |
| 2,675,672 | 4/1954 | Schorner | 60/39.12 |
| 2,714,670 | 8/1955 | Linder et al. | 60/39.5 |
| 3,734,184 | 5/1973 | Scott | 48/210 |
| 4,047,901 | 9/1977 | Baron et al. | 48/77 |
| 4,085,578 | 4/1978 | Kydd | 60/39.02 |

FOREIGN PATENT DOCUMENTS 492831 9/1938 United Kingdom .

Primary Examiner—Edward G. Favors
Assistant Examiner—Steven E. Warner

[57] ABSTRACT

A cyclic velox boiler is described wherein solid carbonaceous fuels are burned in pressure vessel containers by cyclic compression and expansion with air or with air and steam as usual gas reactants. During compression air is forced deeply into the pores of the solid fuel and rapid primary burning to carbon monoxide results due to the large internal pore area available. During expansion the primary reacted gases emerge from the pores to mix and react fully with secondary air retained outside the pores in the container. Rapid and complete burning of the char fuel can be obtained in this two step, cyclic burning process and net useful mechanical work can be obtained from an expander engine. The containers and portions of the expander are cooled with water and the resulting steam can be used to generate additional work output via a steam power cycle.

14 Claims, 18 Drawing Figures

SECTION A-A OF FIGURE 3

CYCLIC VELOX BOILER

CROSS REFERENCES TO RELATED APPLICATIONS

The invention described herein is an improvement upon my earlier described invention entitled, "Improved Cyclic Char Gasifier," as described in U.S. patent application Ser. No. 06/328148, filing date Dec. 7, 1981.

The invention described herein is also related to my following U.S. patent applications:

(1) "Torque Leveller," Ser. No. 06/403923, filing date July, 30, 1982.

(2) "Improved Cyclic Char Gasifier," Ser. No. 06/492484, filing date May 6, 1983, a divisional application of Ser. No. 06/328148.

(3) "Cyclic Solid Gas Reactor," Ser. No. 06/473566, filing date Mar. 9, 1983.

(4) "Further Improved Char and Oil Burning Engine," Ser. No. 06/367019, filing date Apr. 9, 1982.

BACKGROUND OF THE INVENTION

1. Field of the Invention

This invention is in the field of pressurized furnace steam boilers and also the field of coal gasifier processes and apparatus utilizing cyclic compression and expansion to force reactant gases into the coal pores and to expand reacted gases out of the coal pores.

2. Description of the Prior Art

The common form of pressurized furnace steam boiler is the Velox boiler wherein an air compressor delivers compressed combustion air into a sealed and pressurized furnace where combustion with added fuel occurs. The combustion gases are cooled when passing over the boiler heat transfer surfaces and steam is generated at pressure inside the boiler. After being thusly cooled, these combustion gases are then expanded through a gas turbine engine whose work output is used to drive the combustion air compressor. By use of adequately high combustion pressures, the net work of the gas turbine engine can exceed the work input to the air compressor and a net useful work output results. As compared to the more usual atmospheric pressure furnace steam boiler, the Velox boiler has the advantages of a smaller size for a given capacity and the possibility of generating a net useful work output, whereas the atmospheric furnace boiler requires some work input to drive the forced and induced draft fans. Descriptions of prior art Velox boiler schemes are presented in references A and B.

The Velox boiler is a special form of combined cycle power plant. The more common form of combined cycle power plant uses a gas turbine cycle with a combustion air compressor, an uncooled combustion chamber, and a gas turbine expander engine, and the expanded gases leaving the gas turbine expander engine are then passed through the atmospheric pressure furnace of a steam boiler to generate steam at pressure for a steam power cycle. Because the gas turbine cycle combustion chamber is uncooled, considerable excess air must be used as a coolant to keep the combustion gas temperatures below those producing damage or deterioration of the gas turbine expander engine. The necessary compression and expansion of this excess air for cooling reduces the efficiency of this common form of combined cycle steam power plant. With a Velox boiler form of combined cycle power plant, the gas turbine cycle combustion chamber is cooled by the steam boiler and excess cooling air is thus not needed and the resulting excess air efficiency losses are avoided in this way.

Combined cycle power plants of either the common type or the Velox boiler type are today essentially limited to using liquid fuels or gaseous fuels and these fuels are today much more costly than coal. When pulverized coal is used in combined cycle power plants, serious blade erosion occurs in the gas turbine expander engine due to the solid ash particles produced.

Efforts to burn coal in lump form in combined cycle power plant gas turbine cycle combustion chambers, in order to avoid the blade erosion problem, have encountered the following problems instead:

a. it is difficult to feed lump coal into combustion chambers, which are always pressurized, by use of prior art lock hopper valves;

b. lump coal bed burning tends to produce channeling and thus to maldistribute the air flow over the fuel lumps, a slight excess of air in one area burning the coal there more rapidly and thus causing yet more air to flow through this consequently reduced flow resistance channel, resulting in still more rapid coal burnup there;

c. fuel spreaders or a moving fuel bed grate are usually required to avoid excessive combustion air channelling and these are difficult to operate and maintain inside a pressurized combustion chamber.

Some of the problems of lock hopper valves when operated at pressure are described in reference C.

As a result of these dificulties with both pulverized coal firing and lump coal firing, few combined cycle power plants now use coal as fuel despite the greatly lower cost of coal. Nor are many new combined cycle power plants likely to be built despite the appreciable improvement in plant efficiency of combined cycle plants since the only useable fuels, gas and oil, have become too costly.

Lump coal is commonly burned in moving beds in steam boilers whose furnaces operate at essentially atmospheric pressure by use of moving grates. Even at atmospheric pressure, however, moving grates are a maintenance problem due to the high temperatures at which they operate and the necessity for motion of the grate. Beds of lump coal are usually capable of removing a higher proportion of the sulfur dioxide from fuel sulfur burnup than are pulverized coal burners due to the closer contact of the sulfur dioxide gas with either basic ash ingredients from the coal or with added basic materials such as dolomite.

It would thus be of great benefit to have available for use in combined cycle power plants a combustion scheme for use in pressurized combustion chambers which could burn lump coal in a fixed bed without the need for fuel spreaders or moving grates and whose lock hopper valves could be operated at low pressures.

The term water is used herein and in the claims to mean either liquid water or steam, which is defined as water vapor, or a mixture of liquid water and steam.

The term boiler means is used herein and in the claims to mean an enclosed pressure vessel with liquid water inlet and steam outlet and with heating surfaces for boiling the enclosed liquid water flowing into the liquid water inlet and for heating the resulting steam at pressure above atmospheric and comprising the usual steam boiler auxiliaries such as pressure relief valves, water level indicators if useable, exterior insulation, etc. Those heating surfaces of a boiler means which directly view a combustion chamber or solid fuel bed are herein and in the claims referred to as radiant heaters since significant heat transfer can occur to these surfaces by radiation from the burning fuel as well as by convection from combustion gases. Those heating surfaces of a boiler means which do not directly view a combustion chamber or solid fuel bed, or whose view thereof shows only small area, are herein and in the claims referred to as convection heaters since most of the heat transfer to these surfaces occurs by convection from hot combustion gases. A boiler means may comprise but a single heating surface, either a radiant heater or a convection heater, but usually more than one heater is used and both radiant heaters and convection heaters are frequently used in combination in a single boiler means. A boiler means can be of the once-through type with liquid water entering the boiler liquid water inlet and the water flows unidirectionally through the boiler heating surfaces toward the boiler steam outlet where the water emerges as steam. Alternatively, a boiler means can be of the separator and recirculator type wherein liquid water and steam pass into a steam and liquid water separator, such as a steam drum, after passing through a principal portion of the boiler heating surfaces. The liquid water separated by the separator is then recirculated back through the same principal portion of the boiler heating surfaces, either by a forced recirculator pump or by a natural convection recirculator. The steam from the separator continues on to superheater surfaces for further heating or to the boiler steam outlet.

Such boilers usually operate at pressures well above atmospheric, a feedwater pump and feedwater pump drive means are used to pump liquid water into the boiler liquid water inlet at a feedwater flow rate equal to the rate at which steam is being formed within the boiler and is leaving via the boiler steam outlet. Various types of feedwater pump flow rate controls are used to insure an adequate flow of liquid water into the boiler to prevent overheating of any of the heating surfaces of the boiler means.

The term superheater means is used herein and in the claims to mean an enclosed pressure vessel with steam inlet and superheated steam outlet and with heating surfaces for superheating the enclosed steam flowing into the steam inlet at pressures above atmospheric. Superheaters can be of the radiant heater type or of the convection heater type or of both types together in combination.

The term reheater means is used herein and in the claims to mean an enclosed pressure vessel with steam inlet and reheated steam outlet and with heating surfaces for reheating the enclosed steam flowing into the steam inlet at pressures above atmospheric. Reheaters can be of the radiant heater type or of the convection heater type or of both types together in combination.

Superheaters and reheaters are very commonly used in fossil fuel fired steam electric power plants in order to keep the steam free of liquid water as it expands through the steam turbine so that blade erosion by liquid drops can be avoided.

The steam side of a boiler means, a superheater means or a reheater means is that side of the pressure vessel in contact with water. The gas side of a boiler means, a superheater means or a reheater means is that side of the pressure vessel in contact with combustion gases or viewing the combustion chamber or fuel bed or both.

The term oxygen gas is used herein and in the claims to mean oxygen molecules not combined with any other chemical elements. Air, for example, is a gas containing appreciable quantities of oxygen gas. Carbon dioxide, on the other hand, is a gas devoid of oxygen gas even through oxygen atoms exist therein combined with the carbon atoms.

The term char fuel is used herein and in the claims to include any carbon containing fuel which is either a solid or can be transformed at least partially into a carbonaceous solid when volatile portions thereof are removed. Included as char fuels within this definition are coal, coke, wood, wood charcoal, oil shale, petroleum coke, garbage, wood bark, wood wastes, agricultural wastes and other carbonaceous materials as well as mixtures of these fuels.

References

A. "Steam Power Stations," G. A. Gaffert, McGraw Hill, New York, 1940, 2nd edition, page 228 to 229 and FIG. 172.
B. "Applied Energy Conversion," B. G. A. Skrotzki and W. A. Vopat, McGraw Hill, New York, 1945, 1st edition, 6th impression, page 314 to 315 and FIG. 9-2.
C. "The METC Prototype Lockhopper Valve Testing and Development Program Review," W. J. Ayers Jr., U.S. Department of Energy, ASME Paper No. 83AESI, 1983.
D. "Steam—Its Generation and Use," Babcock and Wilcox Co., New York, 38th edition, 1972.
E. "Combustion Engineering," G. R. Fryling, editor, Combustion Engineering Inc., New York, 1966, revised edition.
F. British Pat. No. 492,831 of Sept. 28, 1983
G. U.S. Pat. No. 2,714,670 of Aug. 2, 1955
H. U.S. Pat. No. 4,047,901 of Sept. 13, 1977
I. U.S. Pat. No. 1,913,395 of June 13, 1933
J. U.S. Pat. No. 1,992,323 of Feb. 26, 1935
K. U.S. Pat. No. 3,734,184 of May 22, 1973
L. U.S. Pat. No. 2,225,311 of Dec. 17, 1940
M. U.S. Pat. No. 2,624,172 of Jan. 6, 1953
N. U.S. Pat. No. 4,085,578 of Apr. 25, 1978
O. U.S. Pat. No. 2,675,672 of Apr. 20, 1954

SUMMARY OF THE INVENTION

A cyclic Velox boiler plant of this invention comprises a cyclic char gasifier plant, of the oxidation type using pressure vessel containers and preferably modified to carry out essentially full burning of the fuel to carbon dioxide and water at pressure within the containers of the cyclic char gasifier plant, to which is added a steam boiler which, being heated by the cyclic char gasifier combustion gases, acts to cool down these combustion gases before they enter the expanders of the cyclic char gasifier plant. The steam thusly generated can be used in a steam power cycle with a steam turbine to generate work output additional to any generated by the expander engine of the cyclic char gasifier plant. In this way a conbined cycle power plant of the cyclic Velox boiler type is created wherein char fuels can be burned in lump form in a fixed fuel bed and hence without problems of expander engine blade erosion due to ash carried over from the combustion chambers, and this is one of the beneficial objects of this invention.

The several containers of the cyclic char gasifier plant are preferably enlarged sufficiently to carry out full burning and become combustion chambers each of which cycles between a high pressure and a low pressure. Hence, refueling and ash removal can be carried out at intervals at low pressures and this is another of the beneficial objects of this invention.

BRIEF DESCRIPTION OF THE DRAWINGS

A schematic diagram of one form of cyclic Velox boiler plant is shown in FIG. 1.

The changeable gas flow connections, between a single example container, and each stage, of the compressor and each stage, of the expander of a cyclic Velox boiler plant are shown schematically in FIG. 2.

Figure 3:
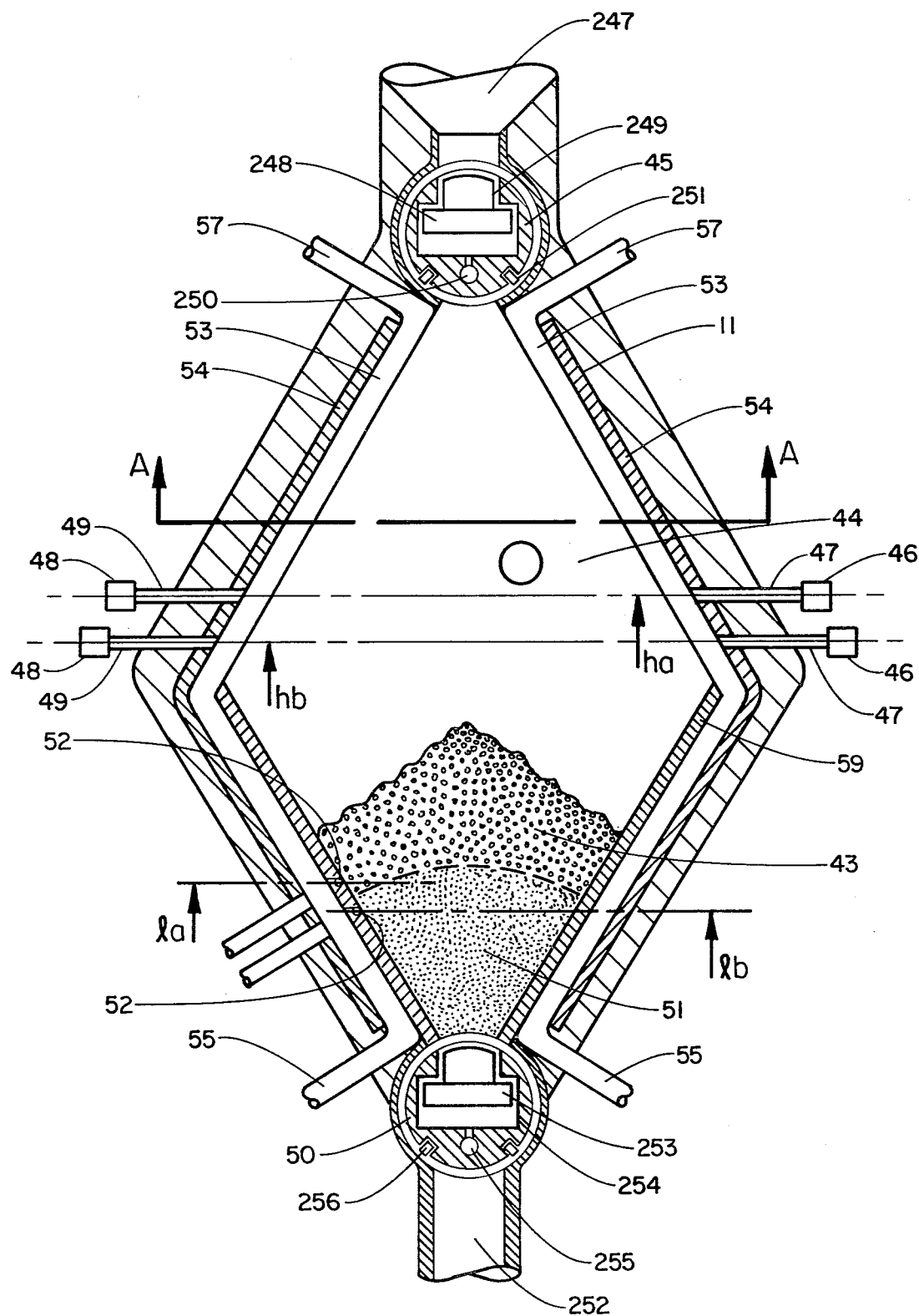

A cross-section view of a single pressure vessel container is shown in FIG. 3.

Figure 4:
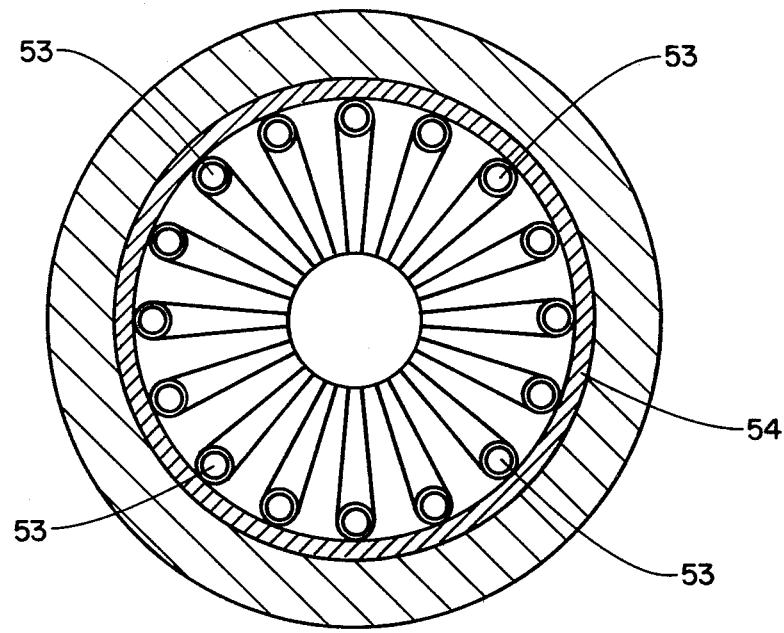

A transverse cross section, A—A, of FIG. 3 is shown in FIG. 4.

Figure 5:
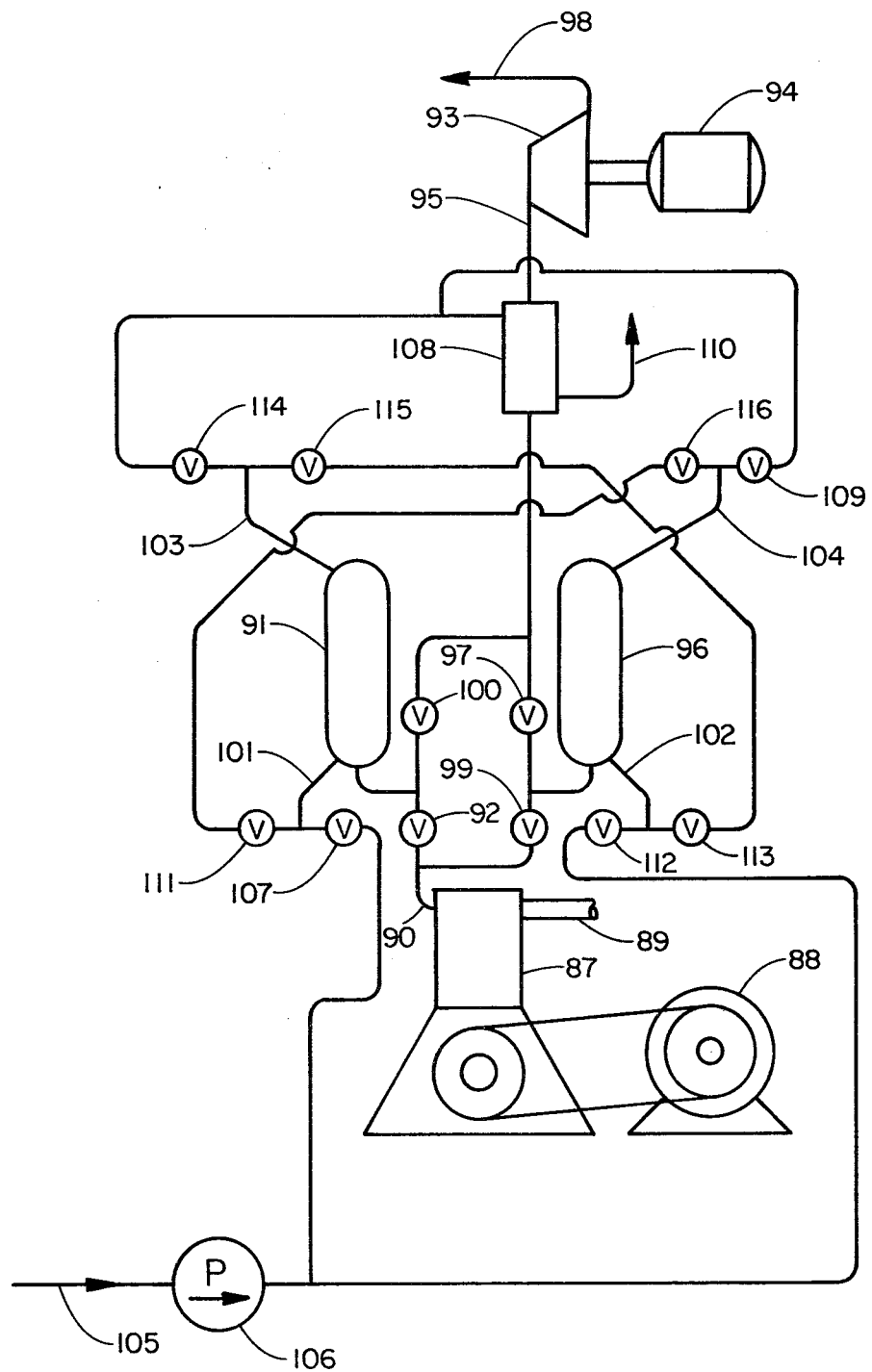

A schematic diagram of a cyclic Velox boiler plant is shown in FIG. 5.

Figure 6:
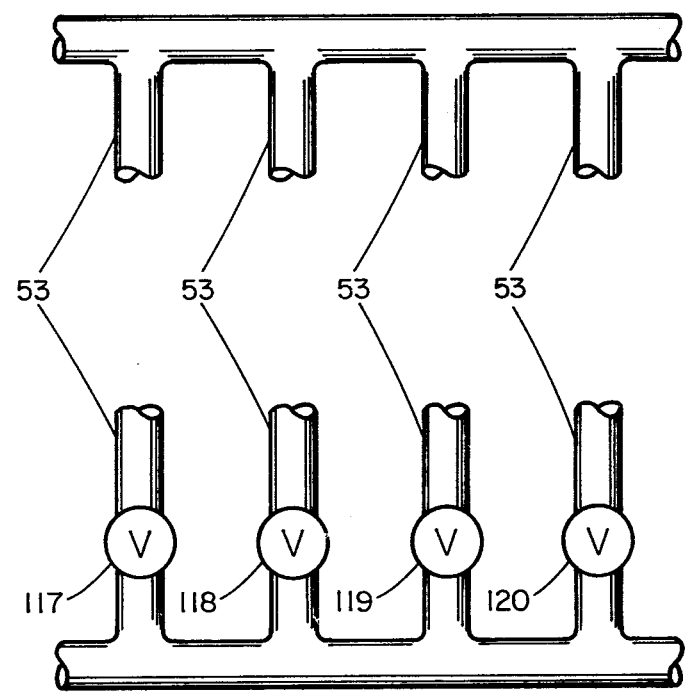

Flow distributors are shown in FIG. 6 for distributing water flow between the several tubes of a radiant heater.

Figure 7:
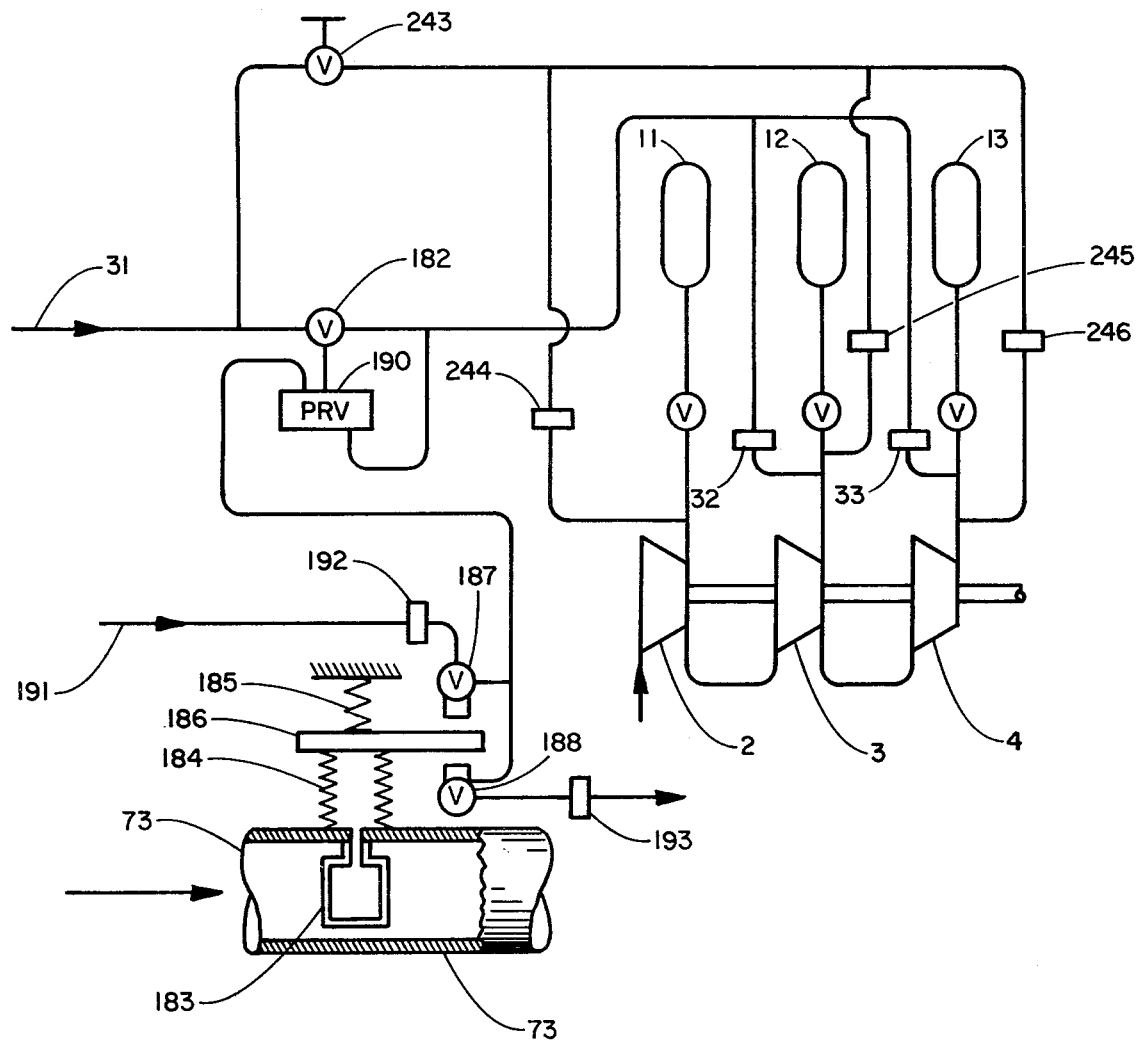

A combustion steam flow control means is shown schematically in FIG. 7 for use as a steam superheat controller.

Figure 8:
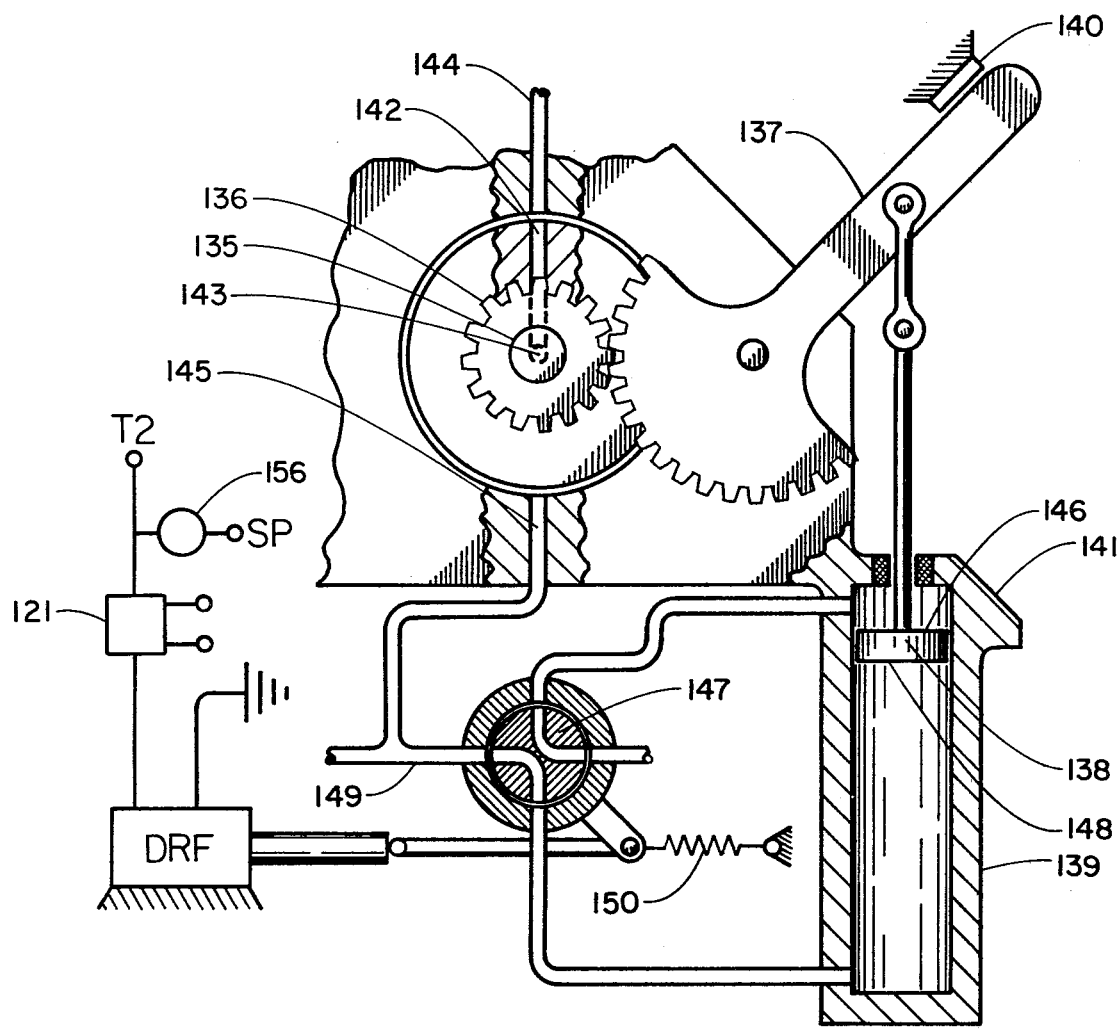
Figure 9:
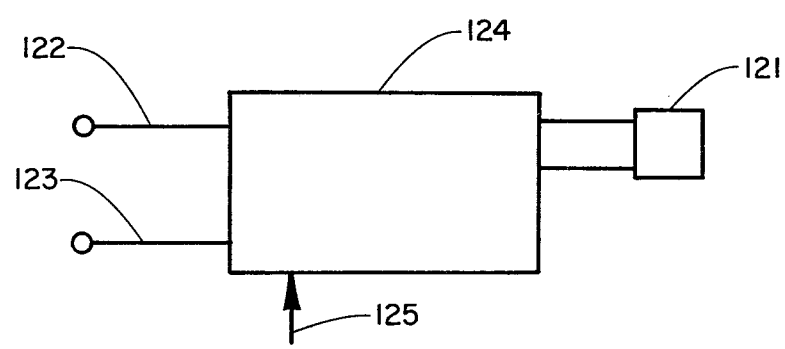
Figure 12:
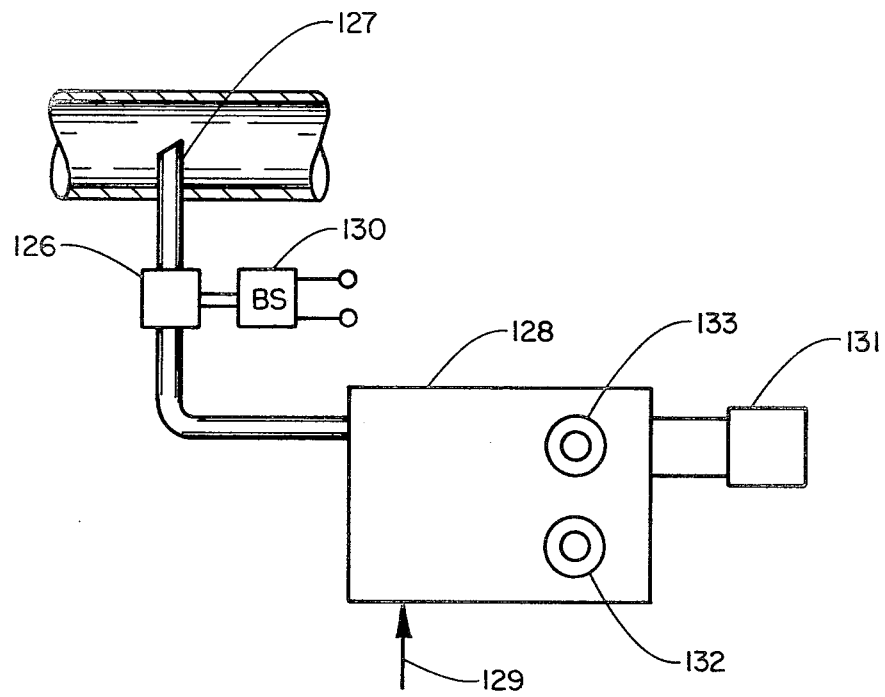

A drive means suitable for use with a refuel means or a coke removal means is shown in FIG. 8, and a portion of a refuel control means therefor is shown in FIG. 9, and a portion of a coke removal control means therefor is shown in FIG. 12.

Figure 10:
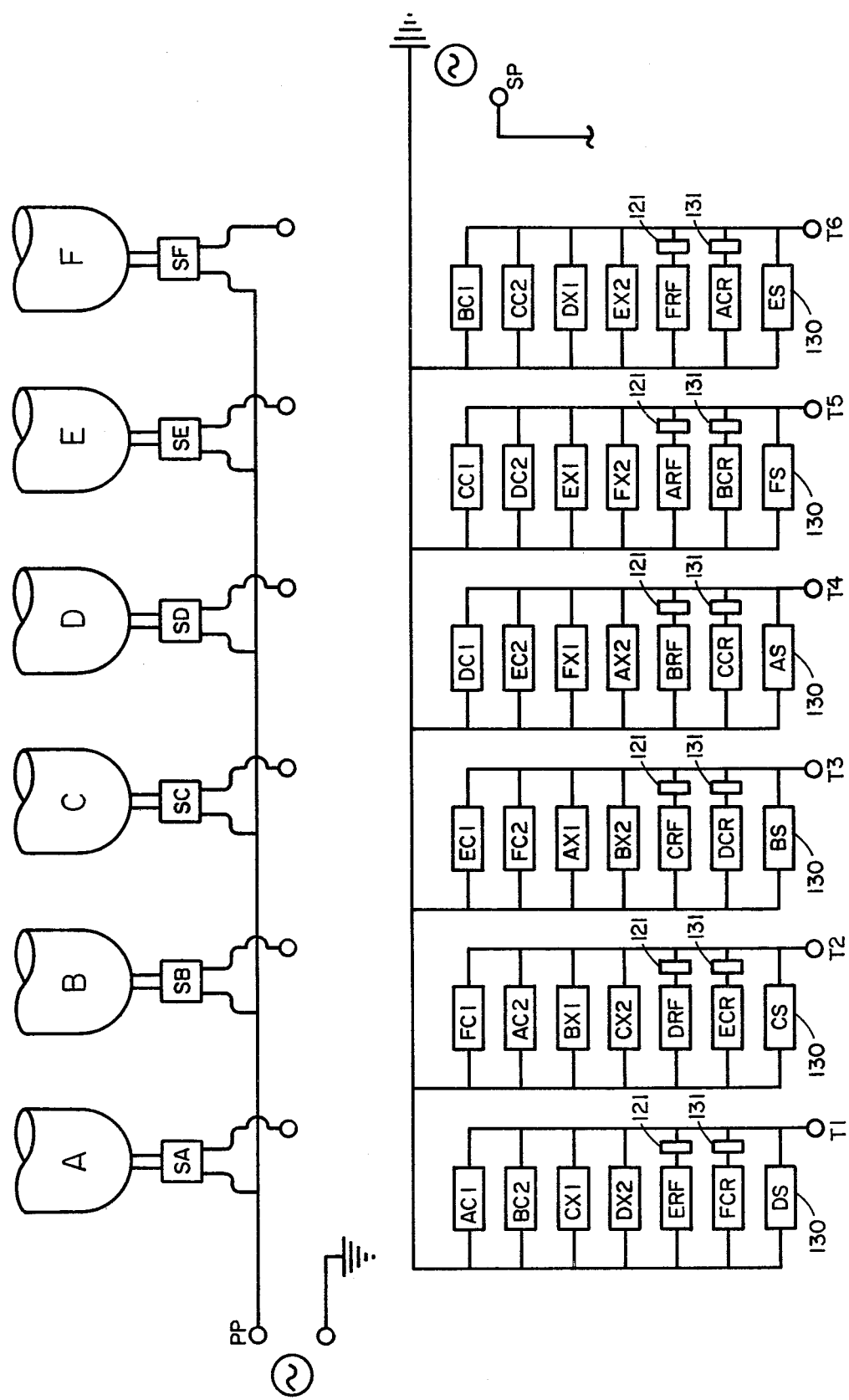
Figure 11:
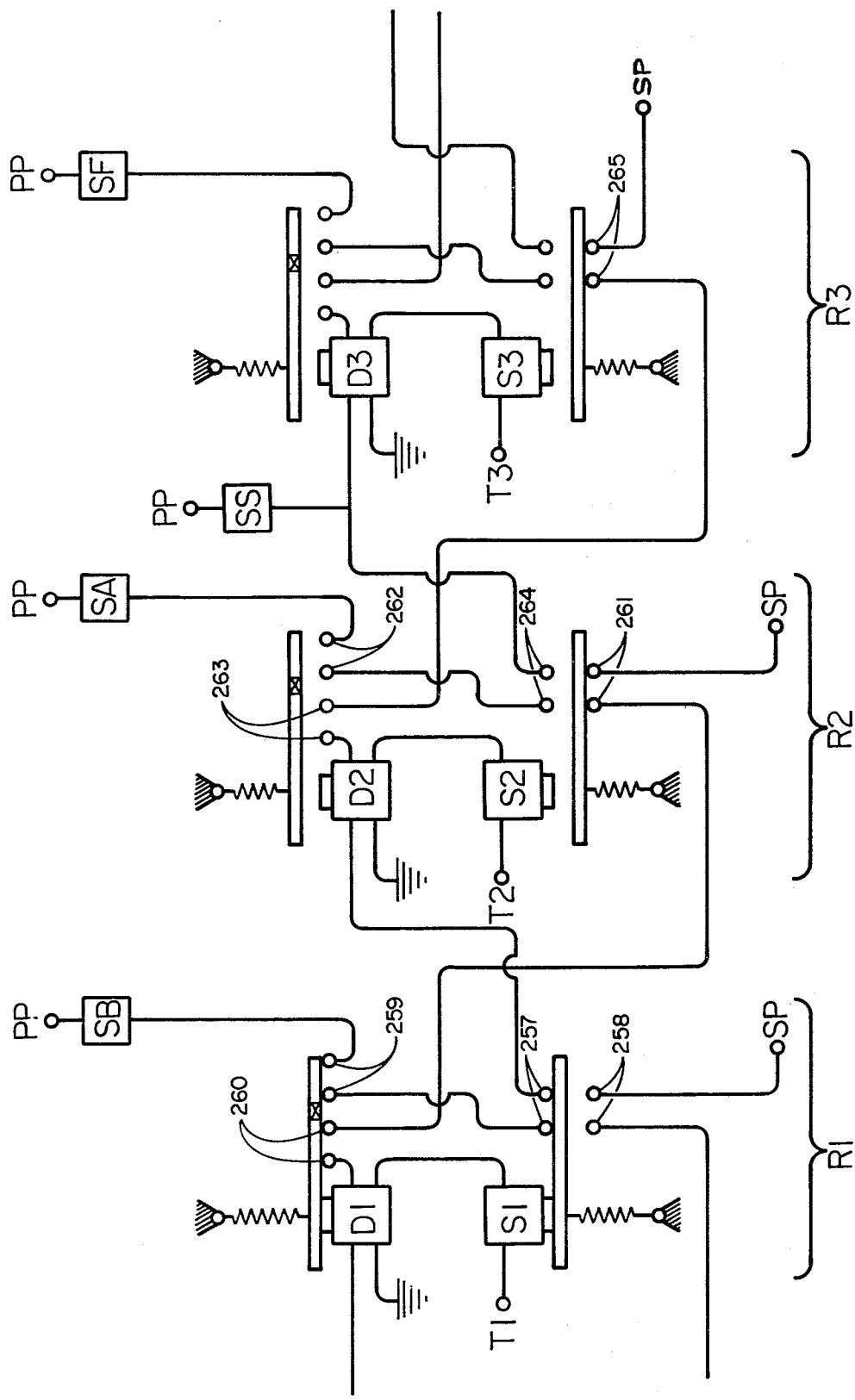

A portion of a control scheme for pressure control of refuel and coke removal and of the changeable gas flow connections is shown schematically in FIGS. 10 and 11.

Figure 13:
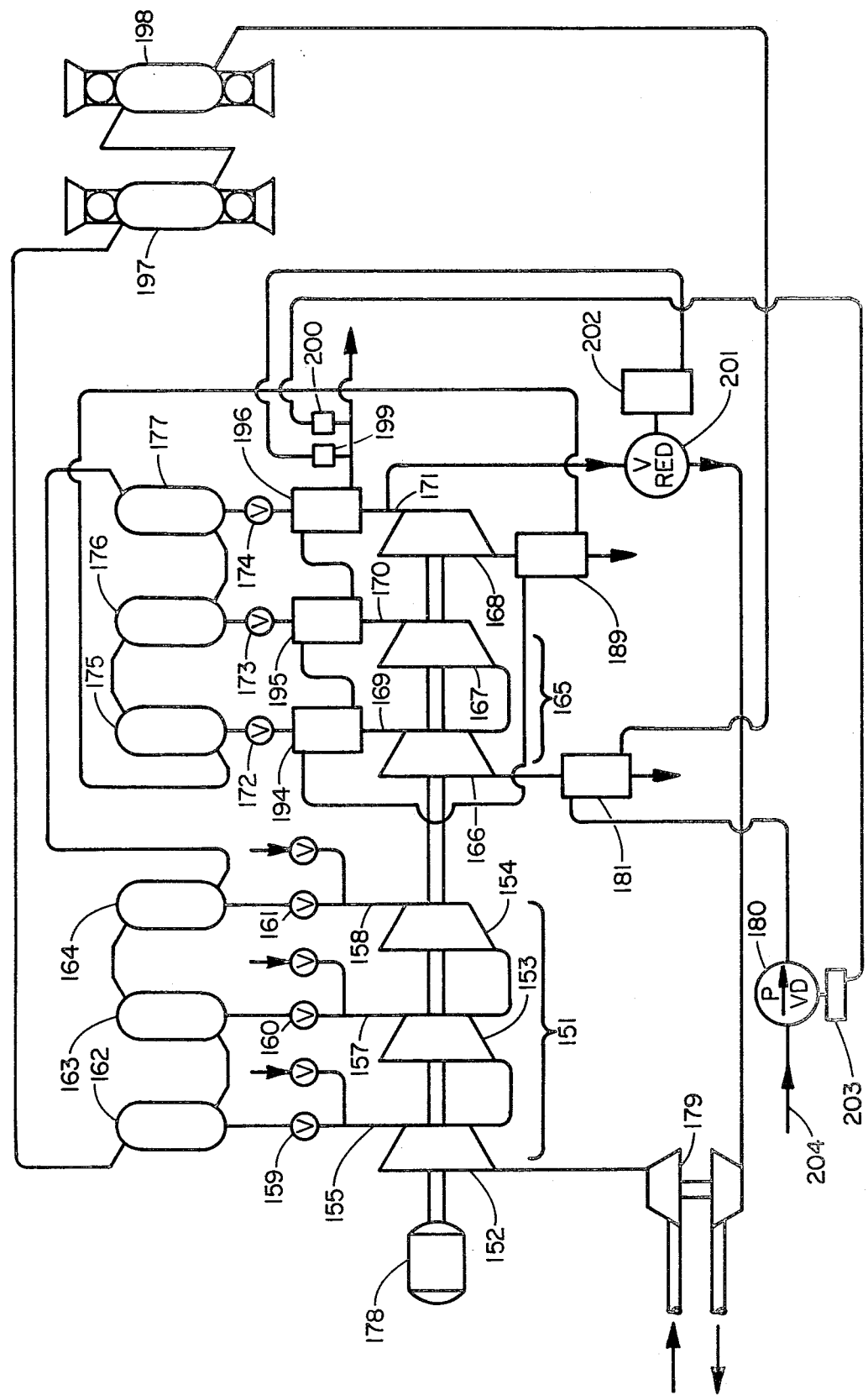

Another form of cyclic Velox boiler plant with fixed series connected radiant heaters is shown schematically in FIG. 13.

Figure 14:
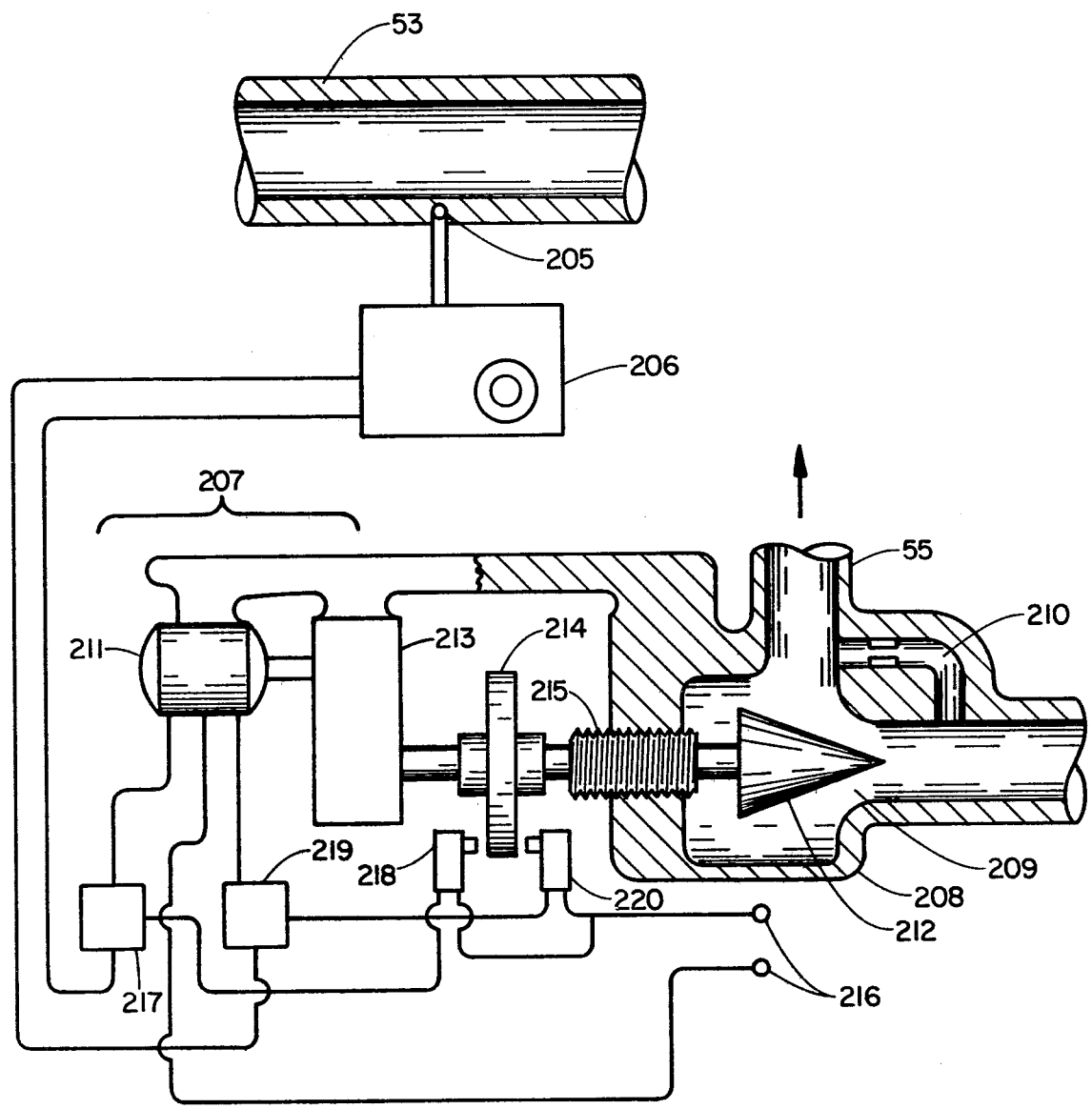

An adjustable water flow distributor and control means is shown in FIG. 14.

Figure 15:
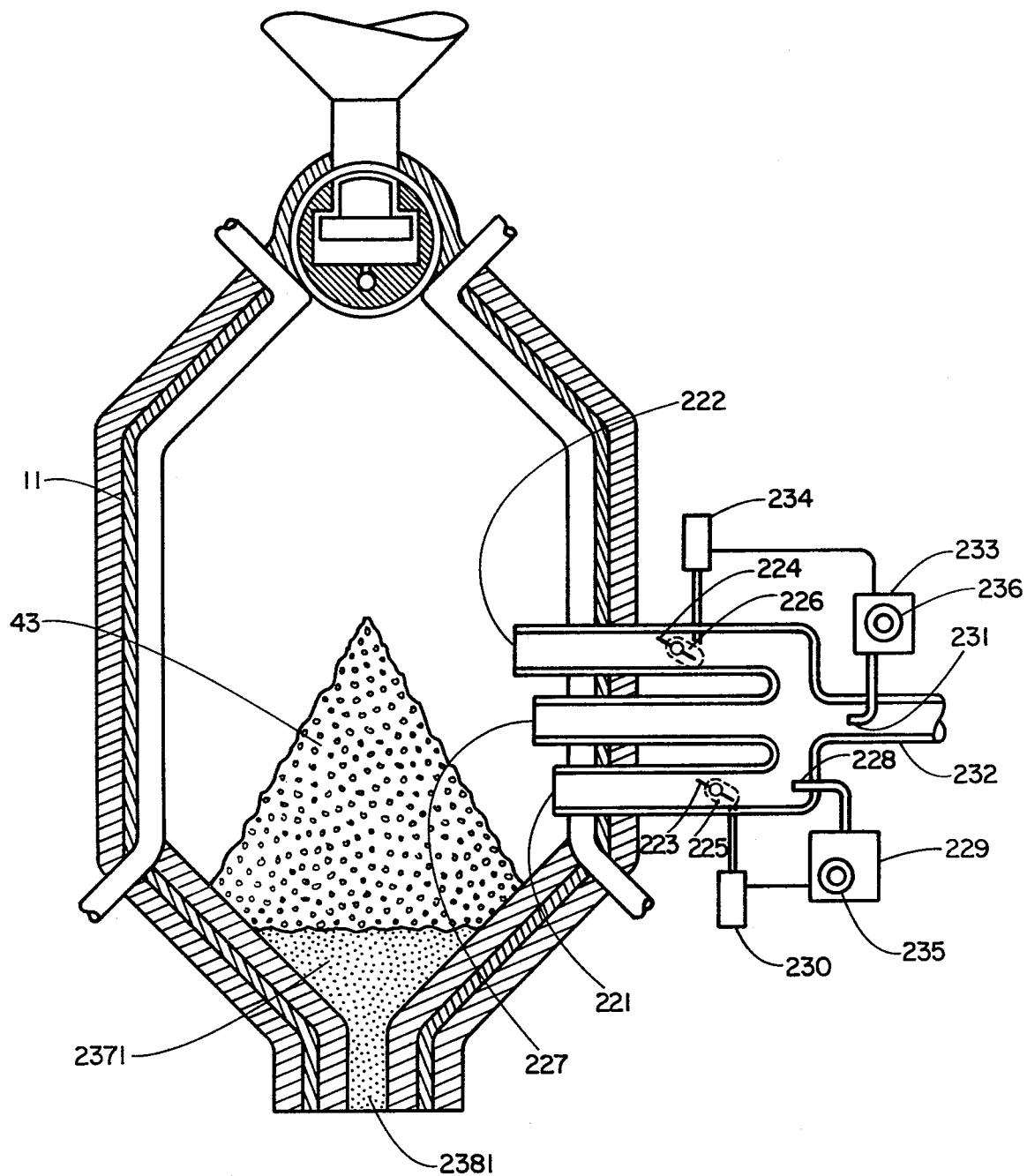

A means for controlling the outflow of gases from a container during expansion is shown in FIG. 15.

Figure 16:
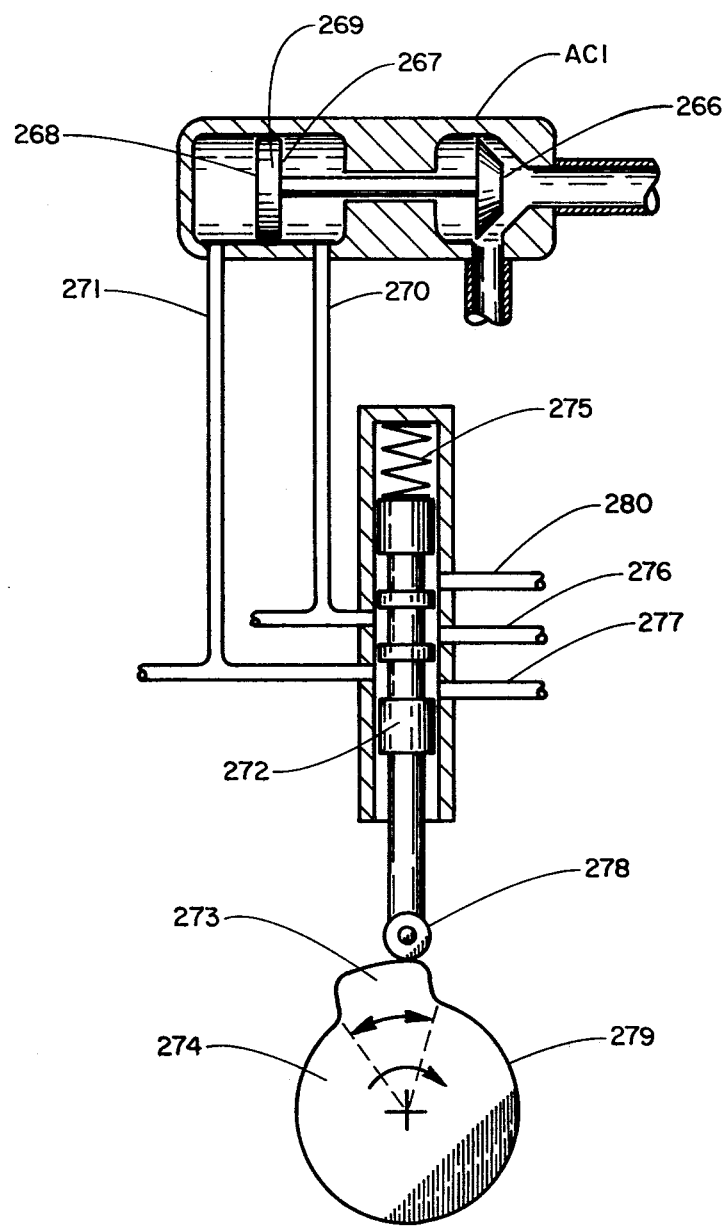
Figure 17:
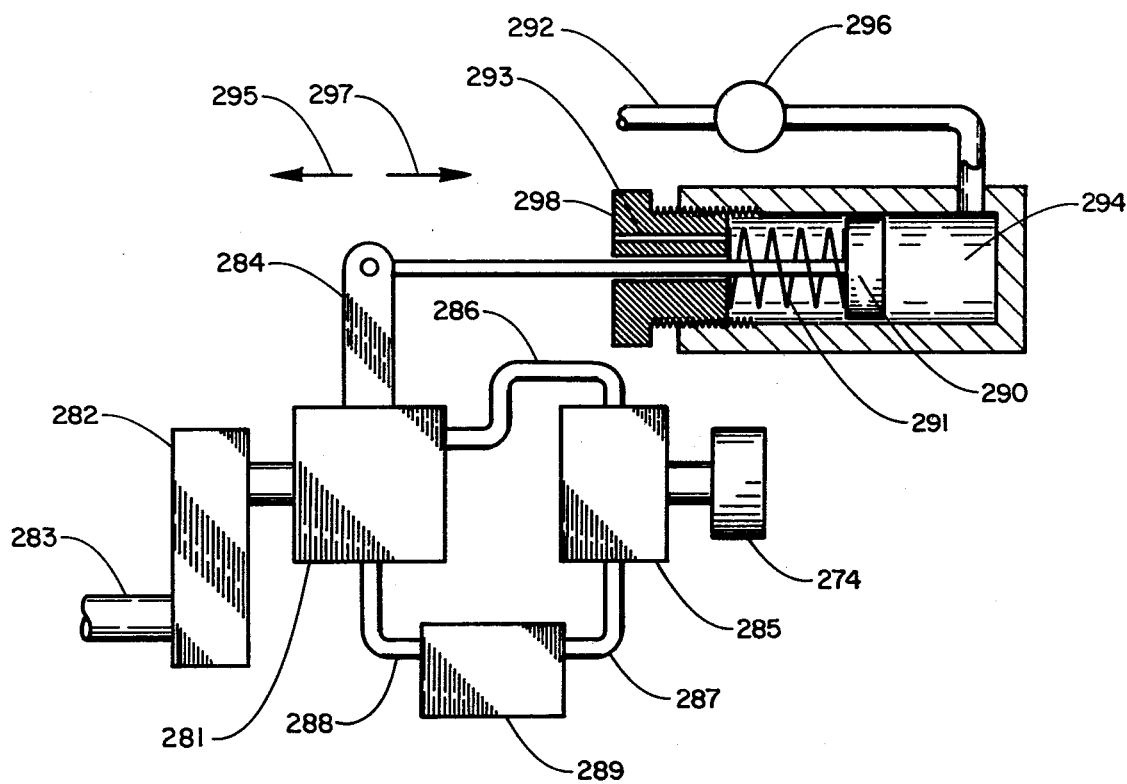

An alternative pneumatic control means for controlling the changeable gas flow connections and the refuel and coke removal connecting is shown partially in FIGS. 16 and 17.

Figure 18:
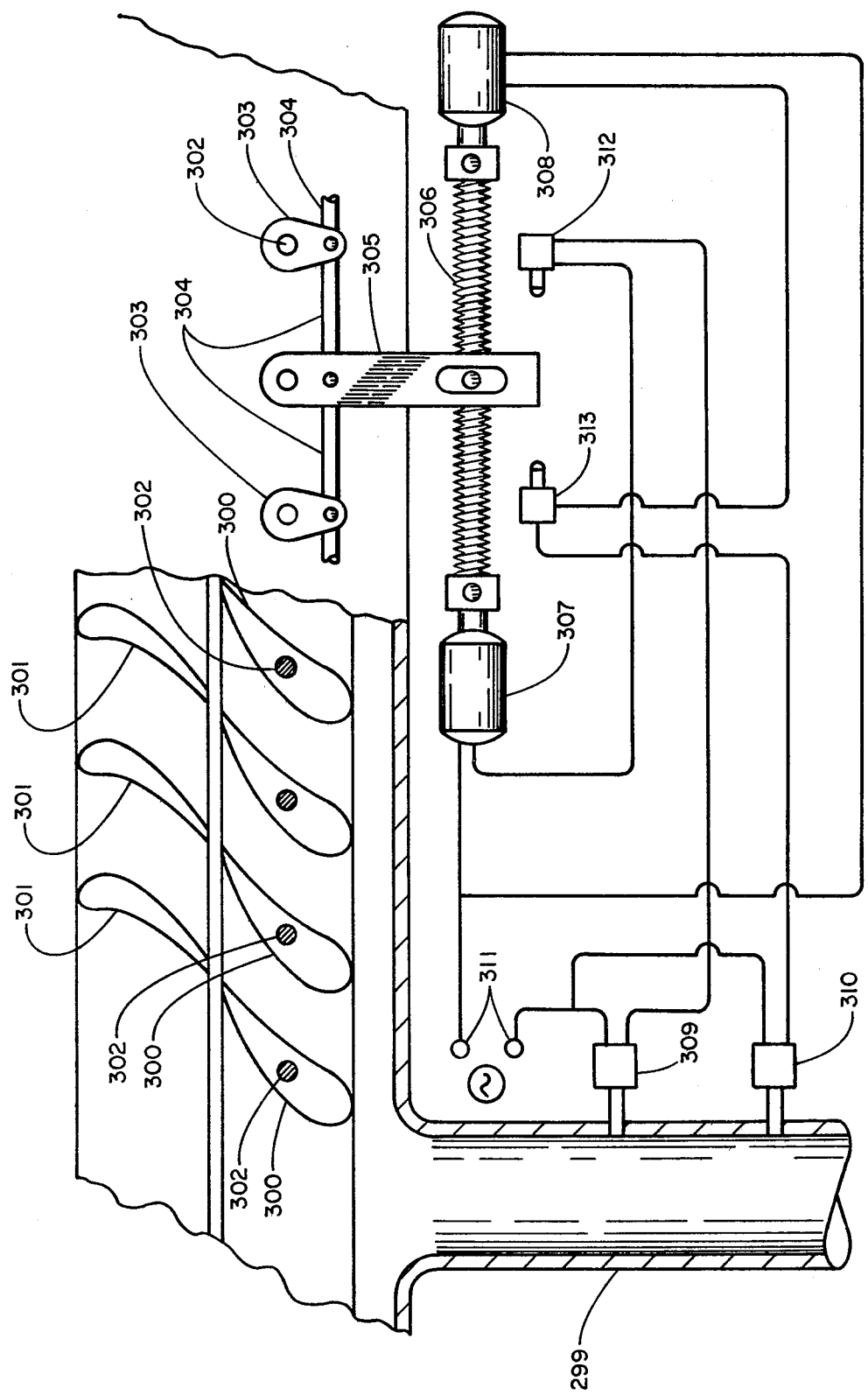

A means for controlling gas flow rate through the expander is shown partially in FIG. 18.

DESCRIPTION OF THE PREFERRED EMBODIMENTS

A. Basic elements

All forms of the cycle Velox boilers of this invention comprise the following elements;

1. A cyclic oxidation char gasifier plant of the pressure vessel container type as described in my co-pending, cross-referenced, U.S. patent application Ser. No. 06/328,148, filing date Dec. 7, 1981. This cyclic char gasifier portion of this invention comprises combinations of reactant gas compressors with drive means, two or more pressure vessel char fuel containers with means for refueling, reacted gas expanders, together with means for connecting each container in turn, first to each stage of the compressor in order of increasing pressure, and then to each stage of the expander in order of decreasing pressure. With this apparatus the char fuel within the containers is first compressed with fresh reactant gases containing oxygen gas and the resulting primary reacted gases are then expanded out of the char fuel pores and this cycle is repeated with fresh reactant gas for each compression and with reacted gases removed during each expansion. Preferably the containers are only partially filled with char fuel so that extra reactant oxygen gas is available in the resulting dead volume to react with the primary reacted gases, emerging from the pores during expansion, to form secondary reacted gases. In this way complete burning of the char fuel to carbon dioxide can be achieved within the containers. Preferably the expander is an expander engine capable of producing work and for oxidation gasifiers this expander work can exceed the work of compression and a net work output results which is one of the beneficial objects of this invention. When such work expanders are used a work absorbing element is also used such as an electric generator. The containers for the char fuel are sealed pressure vessels fitted with a refuel means to replace the char fuel as it is reacted to gases. Usually, a coke removal means to remove ashes is also fitted to the pressure vessel containers. A wide range of char fuels can be gasified and burned in the cyclic char gasifier portion of this invention including coal, wood, oil shale, and other carbonaceous materials and these char fuels can be used alone or in combination.

The term reactant gas is used herein to refer to those gases being compressed into the pores of a char fuel. The resulting gaseous products of reaction of the reactant gas and the char fuel within the char pores are referred to herein as the primary reacted gases. When primary reacted gas is removed from the pores during expansion, it may react further with reactant gases retained outside the pores and the gaseous products of this secondary reaction outside the pores are herein referred to as secondary reacted gases.

Where air or air and combustion steam are used as reactant gases, the primary reacted gases contain carbon monoxide and may contain hydrogen as shown by the following reaction balance for complete reaction to carbon monoxide:

$$(2+a)C + O_2 + aH_2O + 3.76N_2$$
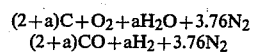
$$(2+a)CO + aH_2 + 3.76N_2$$

Wherein (a) is the molal ratio of combustion steam to oxygen. Where sufficient reactant air is retained outside the char pores to fully burn the emerging primary reacted gases during expansion, the secondary reacted gases contain carbon dioxide and may contain water vapor as shown by the following reaction balance for complete reaction to carbon dioxide:

$$[(2+a)CO + aH_2 + 3.76N_2] + 0(1+a)O_2 + (1+a)3.76N_2 \rightarrow (2+a)CO_2 + aH_2O + 7.52N_2 + 3.76aN_2$$

In most cases, some excess air will be needed to carry out these secondary reactions to essential completion. To get these oxidation gasification reactions started, the char must be brought up to its rapid burning temperature. This rapid burning temperature differs somewhat between different chars but almost all char fuels will react rapidly with air at temperatures of about 1000° F. or greater and some char fuels react readily at temperatures as low as 800° F. For startup the char fuel can be heated up to its rapid burning temperature by several different means of which the following are examples:

(i) Cyclic compression and expansion with preheated air or preheated oxygen-rich gas is a preferred starting means. This air preheating can be done in several ways as for example with electrical heaters or combustion-fired heaters and preferably after the air has been compressed.

(ii) Cyclic compression and expansion with air on a char fuel soaked with a volatile hydrocarbon which latter can be spark or compression ignited and thus heat up the compressed air and char fuel.

(iii) Where very high pressure ratios are used, the cyclic compression and expansion may alone be sufficient to bring the char fuel up to its rapid burning temperature.

(iv) Electrical or furnace heating schemes can also be utilized.

Combinations of these and other starting means can also be used.

Once started, the reaction of the char fuel with oxygen will elevate the char temperature further and burning can thereafter continue without use of the startup means, provided the average reacted gas temperatures are kept sufficiently high. When fresh char fuel is introduced, it will be soon heated up to the rapid reaction temperature by adjacent hot and burning char. As reactant gases enter the char pores during compression, both oxygen and steam react rapidly with adjacent hot carbon and the char fuel and primary reacted gases tend to reach the same average temperature. Hence, we prefer to keep the average primary reacted gas temperature above the rapid reaction temperature of the char fuel (circa 1000° F., 1460° Rankine). As combustion steam oxygen ratio, a, is increased, the average temperature of the primary reacted gases decreases since the steam oxidation of carbon is endothermic. If too much steam is used, the average reacted gas temperature, and with it the average char temperature, will drop below the char rapid reaction temperature and the oxidation gasification reaction will die out. Hence, the maximum value of the overall steam oxygen ratio for practical use is set at about that value, yielding an average primary reacted gas temperature equal to the char fuel rapid burning temperature. For example, an approximate calculation for a cycle pressure ratio of compression of 34 to 1, using unpreheated air with steam as reactant gases, showed that the overall combustion steam oxygen ratio, a, should not exceed about 1.50 if reacted gas average temperatures are to be kept above about 1000° F. Higher values of steam oxygen ratio can be used at higher values of cycle pressure ratio and with preheated reactant gases.

Any of the several different kinds of compressors, such as piston compressors, roots blowers, centrifugal compressors, axial flow compressors, etc., can be used alone or in combination as the reactant gas compressor. Multistage compressors may be preferred in cases where a high cycle pressure compression ratio is used in order to obtain high work output. The particular definition of a stage of a compressor or an expander is used herein and in the claims to be a portion of said compressor or expander which has a gas flow inlet and a gas flow outlet, both of which make connections external from the compressor or expander. For example, a single stage thusly defined could contain several piston and cylinder units acting to compress gas in series provided that all gas flow between such units went exclusively between units and not externally. When two or more compressor stages are connected in series with the delivery of a first stage connected to the supply of a second stage, whose delivery may in turn be connected to the supply of a third stage, the pressure at delivery necessarily rises from first stage to second stage to third stage and so on since each succeeding compressor stage receives at supply gas already raised to a higher pressure by the preceding stage. Hence, such later compressor stages connected in series are commonly and herein referred to as higher pressure stages.

Any suitable drive means can be used to drive the compressor such as electric motors, steam turbines, or preferably the expander engine of the char gasifier plant itself. Either constant speed drive or variable speed drive of the compressor can be used.

Any of the several different kinds of expander engines, such as piston engines, radial flow turbines, axial flow turbines, etc. can be used alone or in combination as the reacted gas expander engine. A simple blowdown pipe can alternatively be used as a low-cost, non-engine expander but the available work of expansion is then lost so this type of expander is probably practical only when other work sources for driving the compressor are readily available and cheap. Multistage expanders may be preferred where a high cycle compression ratio is used to obtain high work output and so that high expander efficiency can be obtained by operating each stage over only that narrow range of pressures for which it was optimally designed. When two or more expander stages are connected in series, with the discharge of a first stage connected to the inlet of a second stage whose discharge may in turn be connected to the inlet of a third stage, the pressure at inlet necessarily decreases from first stage to second stage to third stage and so on since each succeeding expander stage receives at inlet gas already expanded to a lower pressure by the preceding stage. Hence, such later expander stages connected in series are commonly and herein referred to as lower pressure expander stages. Expander stages or groups of stages not thusly connected together in series are herein referred to as separate expanders. The work output of the expander engine can be absorbed in one or a combination of ways, as, for driving the reactant gas compressor, for driving an oxygen enrichment plant, or for driving an electric generator. The flow rate of reacted gases to the expander is set by the rate at which reactant gases are delivered into the char fuel pores by the compressor, and by the kind of gasification reactions taking place with the char fuel and subsequently with reactant gas outside the pores. The expander must pass this reacted gas flow rate so that the reacted gases are fully expanded out of the char pore space down to the minimum cycle pressure in time to make way for the fresh reactant gases of the next following cycle of compression. This desired control of expander flow rate of reacted gases can be accomplished in one or a combination of several ways as, for example, by throttling the reacted gas pressure, by controlling nozzle flow area for blowdown expanders and for turbine expanders, by controlling cut-off timing for piston expanders. Throttling control, while mechanically simple, reduces the work output available from an expander engine. Various means of controlling nozzle flow area are already well known in the art of steam and gas turbine. Various means of controlling the timing of cut-off of flow of high pressure gas into the cylinder of a piston expander engine are already well known in the art of piston steam engines. One scheme for assuring that the desired minimum cycle pressures will be achieved within the cycle time interval is to actuate the reacted gas flow rate controller of the expander in response to the minimum cycle pressure actually reached within the containing means, expander flow rate being increased when minimum cycle pressure increases and being decreased when minimum cycle pressure decreases. This same scheme of control can also be applied to the particular case where multistage expansion is used, and each stage is connected to a separate containing means, and each containing means is connected in turn to each expander stage as expansion proceeds as will be further described hereinbelow. For this particular case, the reacted gas flow rate controller of each expander stage can be actuated as described above by the minimum pressure reached within the connected containing means just prior to when that containing means is to be next connected to the next following expander stage. Alternatively, the reacted gas flow rate controller can be actuated as described by the starting pressure of each containing means as it first connects to that expander stage being controlled. The expander must be designed to possess a maximum reacted gas flow capacity at least equal to the maximum flow rate available from the containing means and char gasification process being used when operating with the desired minimum cycle pressure.

Where the reactant gas compressor is separately driven as by an electric motor, the expander engine will start up and run as soon as high pressure reacted gas is admitted into the expander. Where the reactant gas compressor is driven only by an expander engine, startup can be accomplished in various ways as, for example, by spinning up the connected compressor and expander by an electric motor, or by admitting high pressure steam to the expander engine inlet.

The total number of separate containers for a plant must at least equal the sum of the number of compressor stages plus the number of expander stages in order that each such stage always has a connection into a container. The connectings which the containers make to compressor discharges and to expander inlets change and such connectings are herein and in the claims referred to as changeable gas flow connectings. Other gas flow connectings, as between stages of a compressor or an expander, are fixed and remain open whenever the plant is operating, and these are herein and in the claims referred to as fixed open gas flow connections. Changeable gas flow connections can be opened and closed while the plant is operating. Although the opening and closing of the changeable gas flow connections can be carried out entirely by hand, it will usually be preferable to accomplish this control automatically.

A simple control scheme is to set a particular value of cycle time, tc, and time between changes of connectings, tcc, and then observe the actual maximum cycle pressures, PM, achieved, and then increase tc when PM is too low or decrease tc when PM is too high. This adjustment of tc in response to PM can be done by hand or automatically by methods already known in the art of controls. Other cycle time control methods can also be used as, for example, setting a particular value of PM and when this pressure is reached by each container in turn, a pressure sensor triggers the several valves to change connectings and start the next time interval in the sequence. Whatever cycle time control scheme is used, it functions by actuating the several valves and connections of the changeable gas flow connectings so that each container in turn is connected in sequence separately to each compressor stage in order of increasing pressure and then separately to each expander stage in order of decreasing pressure, and so that each compressor stage and each expander stage is always connected to a single container.

The term cyclic oxidation char gasifier plant is used herein and in the claims to mean the combination of elements as described hereinabove and as described in my co-pending, cross-referenced U.S. patent application, Ser. No. 06/328,148, filing date Dec. 7, 1981.

2. A boiler means for heating and boiling liquid water at pressure and for superheating the resulting steam, if desired, at least one portion of which is a radiant heater located on the interior surface of one of the pressure vessel containers of the cyclic oxidation char gasifier. Preferably, a radiant boiler heater is located in each of the pressure vessel containers. This boiler performs the dual functions of generating steam for external use, as in a steam power plant cycle, and also of cooling down the combustion gases formed inside the containers sufficiently for safe use in the expander of the cyclic gasifier plant.

3. A feedwater pump and drive means connected to the boiler means so as to pump liquid water into the boiler water inlet against the boiler steam pressure with a control means for controlling the water flow rate. Usually, the control means functions to keep the liquid water quantity inside the boiler adequate to prevent overheating of any boiler surfaces.

4. A sensor and control means for sensing the char fuel quantity within each container and operative upon the refueling means of the cyclic char gasifier plant to keep the char fuel quantity within selected maximum and minimum limits in each container. The cyclic char gasifier plant can be operated as a gasifier to make a fuel gas, if desired, and in this case each container is to be kept essentially full of char fuel so the refuel control schemes of the cyclic char gasifier can be used. In most applications, however, the char fuel is to be burned essentially completely to carbon dioxide and water. For this latter preferred case, sufficient compressed air is to be kept outside the char fuel pores at the end of compression so as to burn the emerging pore reacted gases fully during subsequent expansion. Hence, in this complete burning case, the char fuel is controlled so as to occupy only a portion of the interior volume of the pressure vessel containers. Various kinds of char fuel volume sensors can be used such as, photoelectric sensors of the height of the char fuel and ash pile inside the container, or sensors of the carbon monoxide and oxygen content of the combustion gases leaving the container to enter the expander inlets.

Although in principle any cyclic oxidation char gasifier plant of the pressure vessel container type can be adapted for use in the cyclic Velox boiler combination of this invention, it will usually be preferable to use cyclic oxidation char gasifier plants which do not have inert gas compression for the final compression step since complete burning of the char fuel is usually to be carried out. In some applications it may also be preferable to use the simpler single expander rather than separate expanders.

B. Added and modified elements

In addition to the radiant heaters inside the containers, convection heater means can be added to the expander stage inlets not only to generate additional steam and for superheating or reheating of steam, but also to additionally cool the combustion gases before they enter the expander. These convection heaters can be of various types as is already well known in the art of steam boiler design as described in chapter 12 of reference D, for example. Preferably, the gas side of each of these convection heaters is positioned between the expander stage inlet and the changeable gas flow connections thereto so that all of the combustion gases which flow from the connected containers into the inlet of that stage of the expander flow first through the gas side of the connected convection heater and are further cooled thereby. These expander inlet convection heaters can be thusly used on one or more of the expander stage inlets. If used to generate additional steam or to superheat steam already generated in the radiant heaters inside the containers, the steam side of these expander inlet convection heaters is so connected to the radiant heaters that at least some of the water which flows through radiant heaters flows subsequently through these expander inlet convection heaters. If used as a reheater, an expander inlet convection heater steam side is connected to receive steam from the source of steam to be reheated and to deliver steam into a reheated steam pipe. One or more of these convection heaters can be placed on each of one or more of the expander inlets.

In theory, the combustion gases which flow from connected containers into the inlets of the expander stages can be cooled by use of these expander inlet convection heaters down almost to the temperatures of the water in the steam side of these heaters. In practice, however, we will rarely wish to cool these combustion gases much below that temperature at which adequate expander durability is obtained. Further cooling of combustion gases at expander inlet below this adequate durability temperature unnecessarily reduces the work output of the expander engine. In usual practice, therefore, these expander inlet convection heaters are a principal design variable with which to achieve desired expander inlet temperatures for adequate durability.

The changeable gas flow connections between containers and expander inlets are preferably fitted with cooling jackets through which water can be circulated to cool these pipes and valves.

Further additionally to the radiant heaters inside the containers one or more exhaust gas convection heaters can be added to the expander discharge so that all of the combustion gases leaving an expander pass next through the gas sides of these exhaust gas heaters. These exhaust gas convection heaters can be used in various ways such as: for a feedwater heater to heat up water before it enters the radiant heaters inside the containers; for further heating and boiling of water recirculating to radiant heaters inside the containers; for superheating the steam leaving the boiler means or leaving the convection heaters on the expander stage inlets. For feedwater heating the steam side of an exhaust gas heater is so connected that all of the feedwater which flows into the radiant heaters flows previously through the exhaust gas feedwater heater. For superheating of steam the steam side of an exhaust gas heater is so connected that all of the steam which flows out of the boiler means flows subsequently through the exhaust gas superheater. When more than one heater is used on a single expander, the gas side of these separate exhaust gas heaters will usually be connected to the expander discharge so that the expander exhaust gas passes first through the superheater and last through the feedwater heater.

The steam capacity and boiler efficiency of a cyclic Velox boiler plant can be greatly increased by use of these exhaust gas heaters since, apart from cost and pressure drop considerations, energy can in principle be extracted from the combustion gases in these exhaust gas heaters up to the point where the combustion gases approach the feedwater entry temperature. In usual practice, therefore, these exhaust gas heaters are a principal design variable with which to achieve desired boiler efficiency.

Where separate expanders are used, it will frequently be preferable to use separate exhaust gas heaters on one or all of the separate expander discharges since the exhaust gas temperatures may differ between the separate expanders. With equal proportions of heat transferred from all combustion gas portions up to the expander inlet the highest temperature exhaust gas will discharge from that expander last to connect to each container and the lowest temperature exhaust gas will discharge from that expander first to connect to each container. These temperature differences can be used to advantage as, for example, by placing a steam superheater exhaust gas heater on the discharge of that expander last to connect to each container and by placing a feedwater heater exhaust gas heater on the discharge of that expander first to connect to each container.

Where several radiant heaters inside containers are used, these may be connected together on the steam side in series, or in parallel, or in series-parallel combination. For fixed series connection, whatever water flows through one radiant heater flows also through all radiant heaters. For parallel connection, whatever water flows through one radiant heater does not flow through any other parallel radiant heater during any one recirculation, and it is necessary that at least sufficient water flow through each radiant heater to prevent overheating of the heater materials.

For efficient utilization of the heat transfer surfaces of series connection radiant heaters, we prefer that the coldest entering water enter the series at that active radiant heater whose container is connected to the first compressor stage outlet and that the water flow direction thereafter be in series through active radiant heaters whose containers connect to compressor stages in the direction of increasing compressor stage delivery pressure. Thereafter, the water flow direction is preferably in series through active radiant heaters whose containers connect to expander stages in the direction of increasing expander stage inlet pressure. By active radiant heaters is meant such heaters inside those containers currently connected to compressor outlets and expander inlets. This preferred series connection of radiant heaters places increasingly higher temperature water in heat exchange contact with increasingly higher temperature gases. But to achieve this preferred result, the steam side connections of each radiant heater must be changed at the same time that the changeable gas flow connections between the several containers and the compressor and expander are changed. Hence, for this preferred series connection pattern changeable water flow connections are needed on the water inlet and steam outlet of each radiant heater together with a means for opening and closing these changeable water flow connections. Additionally, the means for controlling the means for opening and closing the changeable gas flow connections of the cyclic char gasifier can be expanded to also control the opening and closing of these changeable water flow connections so that water flows through the series connected radiant heaters in the preferred direction discribed above. These changeable water flow connecting means, the means for opening and closing them, and the means for controlling the means for opening and closing, can be similar to the changeable gas flow connecting means, the means for opening and closing, and the means for controlling the means for opening and closing, as described in my earlier application Ser. No. 06/328,148, and also described hereinafter.

For efficient cooling of the heat transfer surfaces of parallel connected radiant heaters and for efficient cooling of the combustion gases flowing toward the expander inlets, we may sometimes prefer to distribute the water flow among the several radiant heaters so that the water leaving each radiant heater has approximately the same enthalpy so that leaving all other radiant heaters. Radiant heaters inside containers connected to compressor stage outlets will experience mostly radiation heat transfer from the contained char fuel since dead gas spaces are filled with relatively cold compressed air. Radiant heaters inside containers connected to expander stage inlets will experience not only radiation heat transfer from the contained char fuel but also convection and radiation heat transfer from the complete combustion gases formed during expansion when reacted gases emerge from the char fuel pores and burn fully with the air retained outside the pores. Hence, the heat transfer rate is higher to those radiant heaters inside containers connected to expander stage inlets than to those radiant heaters inside containers connected to compressor stage outlets. But since any one container and its radiant heater is connected in turn to all compressor stage outlets and then to all expander stage inlets, we need to change the distribution of water flow among the several parallel radiant heaters whenever the changeable gas flow connections to containers are changed, with relatively more water being distributed to those radiant heaters whose containers are connected to expander stage inlets than is distributed to those radiant heaters whose containers are connected to compressor stage outlets. For this purpose, a steam enthalpy sensor in each radiant heater steam outlet can operate via a control means upon the water flow distributor means to increase water flow to that radiant heater when enthalpy rises above a set value and to decrease water flow to that radiant heater when enthalpy drops below a set value. Various types of steam enthalpy sensors can be used such as temperature sensors when the steam at exit is to be superheated or heater wall temperature sensors when the steam at exit is to be wet or saturated. This enthalpy sensor control of water flow distribution between parallel radiant heaters may be preferred for once-through type boilers such as are used for steam pressures near or above the critical pressure.

Where steam pressures are sufficiently below the critical pressure, a steam separator, such as a steam drum, can be used after the radiant heaters and the separated liquid water recirculated back through the radiant heaters again. For this case with parallel radiant heaters, we may prefer to recirculate a large volume of liquid water distributed essentially equally between the separate radiant heaters so that the steam is always very wet in all radiant burners. This recirculation scheme avoids constant adjustment of the flow distribution between the radiant heaters and a steam enthalpy sensor and flow distribution control means is not needed.

Removal of the ash, produced by the burning of the char fuel, from each container can be accomplished intermittently by a coke removal transfer means and connecting means, such as are described in my earlier application Ser. No. 06/328,148. Additionally, a sensor and control means for sensing the quantity of ashes within each container is used and acts upon the connecting means, to connect the coke removal transfer means whenever the ash quantity within any container exceeds a maximum set value, and to disconnect the coke removal transfer means whenever the ash quantity within any container becomes less than a minimum set value. Temperature sensors of ash quantity can be used such as are described in the application Ser. No. 06/328,148. Other ash quantity sensor means can alternatively be used such as, with char and ash pile height control, a sensor of the carbon monoxide and oxygen content of the combustion gases leaving the container to enter the expander inlets.

Where to ash is maintained in a molten state, it can be removed continuously via a bottom orifice in each container and this orifice then becomes a coke removal transfer means which is always connected. To seal the container against gas leakage, the molten ash level is kept sufficient to cover the orifice, as by addition of extra ash materials to the char fuel or by adjustment of the ash orifice area. One example of such a continuous molten ash removal orifice is shown in FIG. 15 wherein the molten ash volume, 2371, flows continuously through the orifice, 2381, which is sealed against gas leakage by maintaining the molten ash volume, 2371, always adequate to cover the orifice, 2381.

C. Description of plant operation

Figure 1:
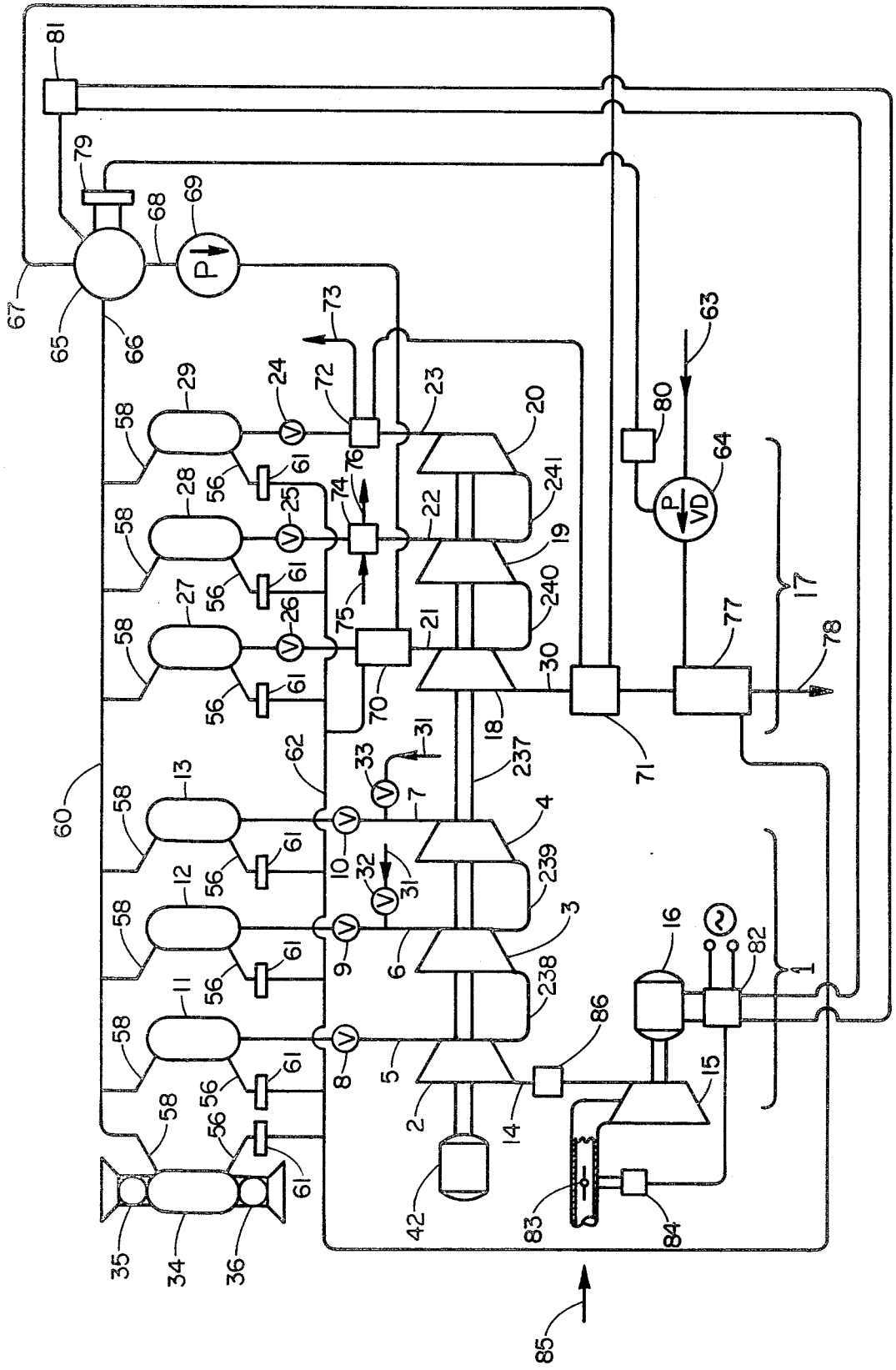

One particular example of a cyclic Velox boiler plant is shown schematically in FIG. 1 and comprises the following:

a. The reactant gas compressor, 1, has three compressor stages, 2, 3, 4, whose outlets, 5, 6, 7, are currently connected via changeable gas flow connections 8, 9, 10, to three containers 11, 12, 13, undergoing compression with air as reactant gas entering the first stage compressor inlet, 14, from the air precompressor, 15, driven by the electric motor, 16.

b. The reacted gas expander, 17, has three expander stages, 18, 19, 20, whose inlets, 21, 22, 23, are currently connected via changeable gas flow connections, 26, 25, 24, to three containers, 27, 28, 29, undergoing expansion of the combustion gases formed inside the containers by reaction of the char fuel therein with the air compressed therein, with the exhaust gas leaving the last stage of the expander via the discharge, 30.

c. Combustion steam from a source, 31, is admitted at pressure via the delivery means, 32, 33, to those containers, such as 12 and 13, which are being compressed by the two higher pressure stages, 3, 4, of the compressor, 1.

d. For the particular example cyclic Velox boiler plant of FIG. 1, air is being used as the source of gas containing appreciable oxygen gas, but oxygen enriched air or other types of sources could also be used.

e. An additional container, 34, is used in this example so that the total number of containers exceeds the number of active containers equal to the sum of the number of compressor stages and the number of expander stages. In this way as each container finishes expanding into the lowest pressure expander stage, 18, it is disconnected for a time period from both the expander and the compressor and at low pressure can undergo refueling with fresh char via the connected refuel transfer means, 35, and can also undergo coke removal via the connected coke removal transfer means, 36, before connecting again to the lowest pressure compressor stage, 2, to commence compression again.

f. Each of the pressure vessel containers, 11, 12, 13, 27, 28, 29, 34, contain a volume of porous char fuel which as it burns up is replaced by the refuel means.

g. A power means, 42, supplies any extra power needed to drive the compressor, 1, and also absorbs any extra power output of the expander, 17.

h. Each of the containers, 11, 12, 13, 27, 28, 29, 34, has changeable gas flow connections to each of the compressor stage outlets 5, 6, 7, and to each of the expander stage inlets, 21, 22, 23; in FIG. 2 are shown these several changeable gas flow connections, 8, 37, 38, to compressor stage outlets, 5, 6, 7, respectively and, 39, 40, 41, to expander stage inlets, 21, 22, 23, respectively, for the single container, 11, and all containers are similarly fitted.

i. All of these changeable gas flow connections, such as, 8, 9, 10, 24, 25, 26, 37, 38, 40, 41, etc. are opened and closed by means for opening and closing, such as a solenoid and spring actuator; a control means operates upon the means for opening and closing so that; each container is opened for a time period separately to each outlet, 5, 6, 7, of each stage, 2, 3, 4, of the compressor, 1, in a subsequence of time periods of open gas flow connections to compressor outlets, this compressor subsequence proceeding in time order of increasing compressor stage delivery pressure and hence in the time order, 2, 3, 4; each container is opened for a time period separately to each inlet, 21, 22, 23, of each stage, 18, 19, 20, of the expander, 17, in a subsequence of time periods of open gas flow connections to expander inlets, this expander subsequence proceeding in time order of decreasing expander stage inlet pressure and hence in the time order, 20, 19, 18; the subsequence of connections to compressor outlets is followed by the subsequence of connections to expander inlets and these together comprise one sequence of time periods of open gas flow connections, each such sequence for each container being followed by a time period for refueling and for coke removal and the sequence of time periods is then repeated; each compressor outlet, 5, 6, 7, always has an open gas flow connection to a single container and each expander inlet, 21, 22, 23, always has an open gas flow connection to a single container whenever the plant is operating.

j. The example char gasifier plant of FIG. 1 has a common shaft, 237, for all stages of the compressor, 1, and expander engine, 17, and this shaft connects in turn to the power means, 42, such as an electric motor-generator. However, separate shafts and separate work input and/or work output devices can be used for some or all stages of the multistage compressor and the multistage expander engine and such separate shaft arrangements may be preferred where both piston and turbine stages are used together in the compressor and/or the expander engine. Additional connections shown in the example of FIG. 1 are: the air supply pipe, 14, to the intake of the low pressure compressor stage, 2; the first intermediate air pressure supply pipe, 238, from the discharge of the low-pressure compressor stage, 2, to the intake of the medium-pressure compressor stage, 3; the second intermediate air pressure supply pipe, 239, from the discharge of the medium-pressure compressor stage, 3, to the intake of the high pressure compressor stage, 4; the first intermediate reacted gas pressure supply pipe, 241, from the discharge of the high-pressure expander stage, 20, to the intake of the medium-pressure expander stage, 19; the second intermediate reacted gas pressure supply pipe, 240, from the discharge of the medium-pressure expander stage, 19, to the intake of the low-pressure expander stage, 18; the exhaust gas pipe, 30, from the low-pressure expander stage. These pipes constitute fixed open gas flow connections which remain open whenever the plant is operating. Further additional connections shown in the example of FIG. 1 are the high pressure steam supply connections, 31, and steamflow control valves, 32, 33, for supply of combustion steam to be added to the air from compressor stages in order to supply reactant gases containing both steam and oxygen into at least some containers. The connections between each container and manifold to each compressor stage and to each expander stage, and not shown in FIG. 1, are shown in FIG. 2 for but one of the containers, 11, and its manifold, 242. The connections and valves, 8, 37, 38, 39, 40, 41, provide a means for connecting the containers, 11, to each of the expander stages, 20, 19, 18, and to each of the compressor stages, 2, 3, 4, and in that order. Each of the containers, 11, 12, 13, 27, 28, 29, 34, are similarly equipped with the changeable gas flow connections with valves, shown in FIG. 2 for container 11, to each compressor stage and to each expander stage.

Figure 2:
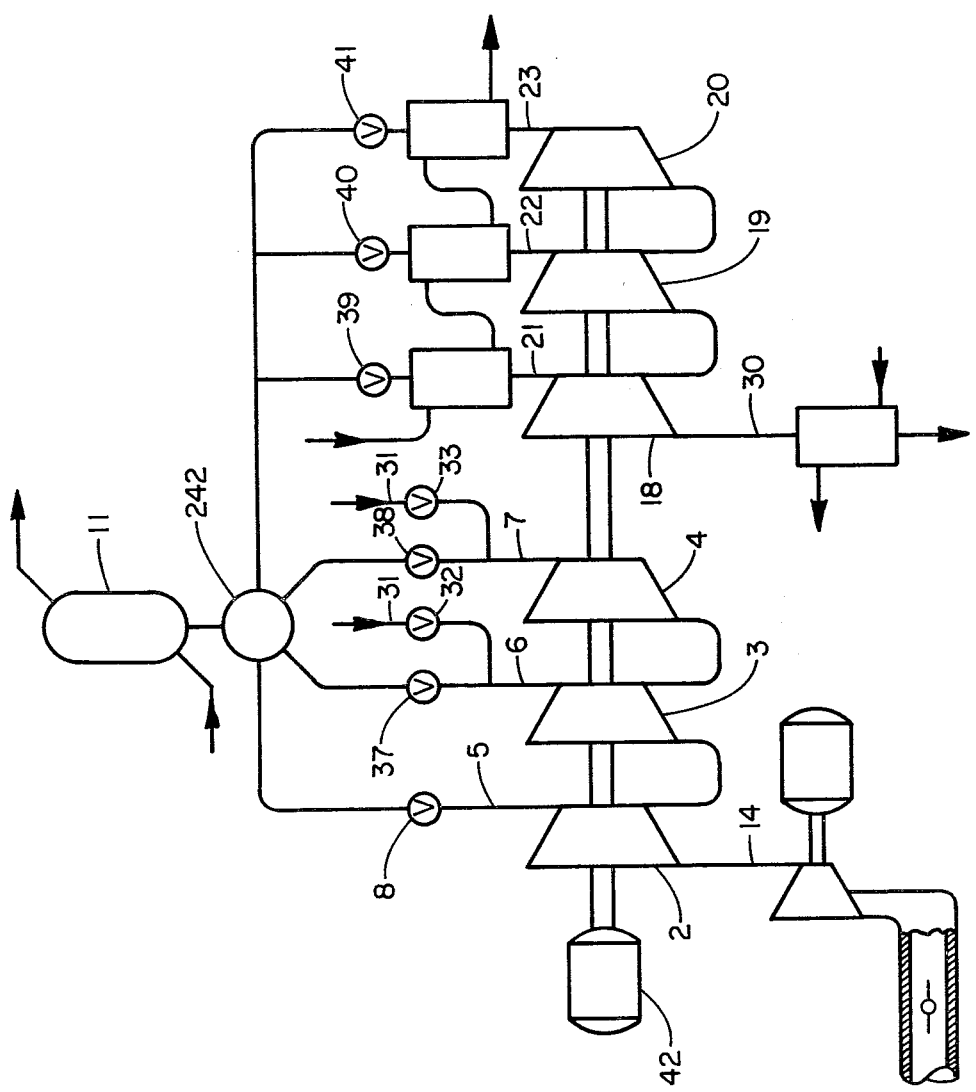

In the operation of the example multistage cyclic oxidation char gasifier plant shown in FIG. 1 and FIG. 2, each container is connected in a sequence of gas flow connectings to the discharge end of each compressor stage and to the inlet end of each expander stage. This sequence of gas flow connectings starts with the lowest pressure stage of the compressor, proceeds in turn through each next higher pressure stage of the compressor, and after the highest pressure compressor stage, continues to the highest pressure stage of the expander and then proceeds in turn through each next lower pressure stage of the expander. After a container has proceeded through this full sequence, the sequence can subsequently be repeated again and again. When pressure vessel containers are used for each container refueling and coke removal are preferably timed to occur at the end of a sequence sometime between disconnecting from the lowest pressure expander stage and reconnecting to the lowest pressure compressor stage to start the next sequence, when the container is at minimum cycle pressure. The next sequence of gas flow connectings can then commence after refueling and coke removal are completed. For example, in FIG. 2 the foregoing sequence of connectings for container 11 can be carried out as follows: valve 8 is opened and valve 37, 38, 39, 40, 41, are closed and container 11 is connected only to the discharge of the lowest pressure compressor stage, 2; after a time interval valve 8 is closed and concurrently valve 37 is opened and container 11 is then connected only to the discharge of the next higher compressor stage, 3; after the next time interval 37 is closed and concurrently valve 38 is opened and container 11 is then connected only to the discharge end of the highest pressure compressor stage, 4; after the next time interval valve 38 is closed and concurrently valve 41 is opened and container 11 is then connected only to the inlet end of the highest pressure expander stage, 20; after the next time interval valve 41 is closed and concurrently valve 40 is opened and container 11 is then connected only to the inlet end of the next lower pressure expander stage, 19; after the next time interval valve 40 is closed and concurrently valve 39 is opened and container 11 is then connected only to the inlet end of the lowest pressure expander stage, 18; after the next time interval valve 39 is closed and a sequence of gas flow connectings has been completed; refueling and coke removal preferably take place for container 11 after valve 39 is closed at the end of one sequence of gas flow connectings and before valve 8 is opened to commence the next such sequence, or while these valves are being closed and opened. Such refueling need not occur between every pair of sequences for a container, and when refueling is to be less frequent, the value of the refuel ratio, Z, is increased so that the number of time periods actually utilized for refueling becomes less than the number of time periods available for refueling as described hereinafter. Similarly, coke removal need not occur between every pair of sequences for a container and less frequent coke removal can be achieved by increase of the coke removal ratio, y, so that the number of time periods actually utilized for coke removal becomes less than the number of time periods available for coke removal. Each of the other containers, 12, 13, 27, 28, 29, 34, also has similar connections and valves to each compressor and expander stage and also is similarly connected in sequence to these stages and to refuel and coke removal in the same manner as described for the one container, 11, except that each container follows out its sequence of connectings in a time order displaced from that of all the other containers so that any one compressor or expander stage is connected to but one container. So that each stage will always have one container connected, the several active containers change gas flow connectings all at the same time and thus the time interval between changes of gas flow connectings, tcc, is the same as between different containers even though it may differ as between different time intervals in a sequence. The cycle time, tc, is then equal to the product of the time interval between changes of gas flow connectings, tcc, if constant, and the sum of the number of containers being compressed, nc, and the number of containers being expanded, nx, which sum, being the number of active containers, also equals the sum of the number of compressor stages and the number of expander stages.

$$tc = (tcc)(nc + nx)$$

The cycle time, tc, is basically determined by how long it takes the compressor to pump up a container from the selected value of minimum cycle pressure, PO, up to the selected value of maximum cycle pressure, PM, and clearly increases with increasing container gas space volume and with decreasing compressor flow rate capacity, ma.

k. Various means for stopping the char gasifier plants of this invention can be used, such as:
   a. Supply sufficient excess steam for stopping to containers being compressed so that the char fuel becomes chilled well below its rapid reaction temperature by the endothermic steam-char reaction.
   b. Recirculate reacted gas, essentially free of oxygen gas, into the air compressor intake and the oxidation gasification reactions cease due to lack of oxygen.
   c. Where the compressor is separately driven it can simply be turned off.

An example of an excess steam stopping means is shown schematically in FIG. 7 and comprises a steam stopping valve, 243, which when opened feeds excess steam into the containers, 11, 12, 13, undergoing compression with air, via the metering orifices, 244, 245, 246, which assures adequate excess steam into each container as to assure stopping. The valve 243 is only to be opened when the plant is to be stopped.

The foregoing elements are parts of the cyclic oxidation char gasifier portion of this example cyclic Velox boiler and operate to carry out a preferably complete burning of the char fuel inside the containers as follows:

(1) As shown in FIG. 3 for the example container, 11, each container has a volume of hot, porous char fuel, 43, inside and during the subsequence of connections to compressor outlets, air is forced into the pores of the char fuel as the pressure rises and reacts therein with the hot carbon to form principally carbon monoxide gas. When steam is also admitted into containers during compression, those steam portions forced inside the char fuel pores react therein also with the hot carbon to form carbon monoxide and hydrogen. Additional air is also compressed into the dead volume, 44, of the container, 11, where no char fuel is located and only very little of this air reacts with char fuel during compression.

(2) During the subsequence of connections to expander inlets, which follows next after the compressor subsequence, the reacted gases formed inside the char fuel pores expand out of these pores as the pressure drops during expansion and react then further with the air previously compressed into the dead volume, 44, to form complete combustion gases containing carbon dioxide and water. Preferably sufficient air is compressed into the dead volume 44, so that the carbon monoxide and hydrogen in the emerging pore gases can be burned essentially completely to carbon dioxide and water. These complete combustion gases then flow through the stages, 20, 19, 18, of the expander engine, 17, doing mechanical work on the engine and leaving as exhaust gas via the discharge, 30.

(3) Preferably the pressure rise of compression is made sufficient that the work done on the expander engine exceeds the work done by the compressor upon the air and a net output work results which is absorbed by the power means, 42, such as an electric generator.

(4) Following the subsequence of connections to expanders, each container is disconnected from both the expander and the compressor for a time period available for refueling and a time period available for coke removal, and these two time periods can be the same time period or can be two successive time periods.

(5) A char and ash pile height sensor and control means, as shown for example in FIG. 3, senses when this pile is above a certain height, ha, and also when this pile is below another certain height, hb, and acts upon the means for connecting the refuel transfer means, 45, to connect the refuel transfer means to the container, 11, during the time period available for refuel whenever the pile height is below the level, hb, and to disconnect the refuel transfer means whenever the pile height is above the level, ha. In this way, the height of the coal and ash pile is kept essentially between these levels, ha, and hb; photoelectric cells, 46, with collimators, 47, facing discrete light sources, 48, with collimators, 49, are an example of such a height sensor.

(6) An ash pile height sensor and control means senses when the ash pile is above a certain height, 1a, and also when the ash pile is below another certain height, 1b, and acts upon the means for connecting the coke removal transfer means, 50, to connect the coke removal transfer means to the container, 11, during the time period available for coke removal whenever the ash pile height is above the level, 1a, and to disconnect the coke removal transfer means whenever the ash pile height is below the level, 1b. In this way, the height of the ash pile, 51, is kept esssentially between these levels, 1a, and, 1b. Temperature sensors, 52, are an example of such an ash pile height sensor since the non-reactive ash pile, 51, is colder than the burning char volume, 43.

(7) These char and ash pile height sensor and control means thus function to maintain the char fuel volume, 43, the ash volume, 51, and the dead volume, 44, approximately constant and between set limits within each of the containers.

The cyclic Velox boiler plant of FIG. 1 additionally includes a steam boiler, a steam superheater, and a steam reheater which comprises the following:

j. Each of the containers, 11, 12, 13, 27, 28, 29, 34, is fitted with a radiant heater section positioned on the interior surface of each container as shown, for example, in FIG. 3 where several tubes, 53, secured to the inner surface of the pressure vessel wall, 54, of the container, 11, comprise the radiant heater heat exchange surfaces. Preferably the tubes, 53, cover as much of the inner surface of the container walls, 54, as possible as is shown in FIG. 4 which is a cross-section, as indicated, of FIG. 3. The several tube inlets, 55, are connected together and to the radiant heater liquid water inlet, 56, and the several tube outlets, 57, are connected together and to the radiant heater water outlet, 58. The radiant heater tubes, 53, are preferably separated from the ash pile, 51, by a covering of protective material, 59, such as a ceramic. Each of the containers 11, 12, 13, 27, 28, 29, 34, is similarly fitted with a radiant heater section and with a radiant heater liquid water inlet, 56, and a radiant heater water outlet, 58.

k. For the particular cyclic Velox boiler plant shown in FIG. 1, these several radiant heater sections are connected in parallel flow, so that whatever water flows through one of the radiant heaters does not flow through any other radiant heater during any one recirculation, by connecting all water outlets, 58, to a common outlet pipe, 60, and by connecting all water inlets, 56, via flow distributors, 61, to a common liquid water inlet pipe, 62. The flow distributors, 61, assure that some water is distributed to all radiant heaters and, for the example of FIG. 1, distribute the water essentially equally to each radiant heater.

l. From a source of boiler feedwater, 63, the feedwater pump and drive means, 64, pumps liquid water into the common liquid water inlet pipe, 62, against the boiler steam pressure. As this water flows through the several radiant heater sections, it is heated inside the tubes, 53, by radiation heat transfer from the burning char fuel pipe, 43, and by convection when the complete combustion gases pass out of the containers during expansion. This heating may cause some of the feedwater to boil and become steam, and this steam and any liquid water then flow out of each radiant heater and into the common water outlet pipe, 60.

m. A steam-liquid separator, 65, such as a steam drum, receives the mixture of steam and liquid water from the radiant heater outlet pipe, 60, via its inlet, 66, and separates the mixture into a steam portion which leaves via the steam outlet, 67, and a liquid water portion which leaves via the liquid water outlet, 68.

n. A liquid water recirculator means, such as a natural circulation downcomer or a forced recirculator pump and drive means, 69, recirculates liquid water from the separator, 65, back to the common liquid water inlet pipe, 62, of the several radiant heaters.

o. A recirculating water convection preheater, 70, can be interposed between the recirculator, 69, and the radiant heater's common inlet, 62, to add additional heat to the recirculating water from the complete combustion gases leaving containers, such as container, 27, while they are connected to the inlet, 21, of the lowest pressure expander stage, 18, via their changeable gas flow connection thereto, 26.

p. A primary steam convection superheater, 71, can be heated by the exhaust gas leaving the discharge, 30, of the lowest pressure expander stage, 18, to superheat the steam leaving the steam separator, 65, via its steam outlet, 67.

q. A secondary steam convection superheater, 72, can be heated by the complete combustion gases leaving containers, such as container, 29, while they are connected to the inlet, 23, of the highest pressure expander stage, 20, via their changeable gas flow connection thereto, 24, to further superheat the steam leaving the primary superheater, 71, before passing the fully superheated steam to its final delivery outlet, 73, to steam users such as a steam turbine engine.

r. A steam convection reheater, 74, can be heated by the complete combustion gases leaving containers, such as container, 28, while they are connected to the inlet, 22, of the intermediate pressure expander, 19, via their changeable gas flow connection thereto, 25, to reheat steam returning via a pipe, 75, from users such as intermediate pressure steam turbine stages and returning to lower pressure stages of the user via a pipe, 76.

s. A feedwater convection heater, 77, can be interposed between the feedwater pump, 64, and the common liquid water inlet pipe, 62, to the radiant heaters to heat the feedwater by the exhaust gases leaving the primary steam superheater, 71, and flowing to the combustion gas exhaust pipe, 78.

t. A steam separator drum liquid level sensor, 79, and control, 80, can sense the liquid water level in the steam drum, 65, and control the feedwater flow rate of the feedwater pump, 64, as by controlling the feedwater pump drive means speed, to maintain an essentially constant liquid water level in the steam drum. In this way, the feedwater pump, 64, functions to replace the steam removed from the boiler via the steam outlet, 67.

u. A steam boiler pressure sensor, 81, and control, 82, can sense the steam pressure in the steam drum, 65, and control the density of the air supplied to the inlet, 14, of the first compressor stage, 2, by controlling the air precompressor, 15, as by controlling the speed of the air precompressor drive motor, 16, so that as boiler pressure decreases below a set value, the air density at the inlet, 14, is increased and as boiler pressure increases above a set value, the air density at the inlet, 14, is decreased. Increase of air density at compressor inlet increases the char fuel burn rate by increasing either the maximum air pressure achieved inside containers during compression or by shortening the time required to reach a set value of maximum compression pressure, and this increased burn rate also increases steam boiling rate by increasing heat transfer from the char fuel and complete combustion gases to the water and steam inside the radiant heaters. Decrease of air density similarly decreases char fuel burn rate and hence steam boiling rate. In this way, the steam pressure in the boiler steam drum, 65, can be maintained essentially constant between set values by action of the steam boiler pressure sensor, 81, and control, 82, upon the compressor inlet air density setting means compressor, 15, and drive means, 16. It is then at this pressure that boiling takes place within the boiler means of this invention. Where very low steam boiling rates are occasionally to be used, the air precompressor, 15, can be supplemented with an intake throttle valve, 83, controlled via a supplemental control, 84, so that air density at compressor inlet, 14, can be less than atmospheric air density at the air intake, 85, if necessary.

v. An intercooler, 86, may sometimes be used to cool down the precompressed air leaving the precompressor, 15, before it reaches the compressor inlet, 14, in order to further increase the air density. Atmospheric air or cooling water are examples of cooling media to use for this intercooler, 86.

These boiler elements of this example cyclic Velox boiler operate to generate steam and to cool down the complete combustion gases of the cyclic oxidation char gasifier as follows:

(8) The complete combustion gases formed inside the containers, such as 27, 28, 29, while they are undergoing expansion, pass along the tubes, 53, of the radiant heaters and through the gas sides of the secondary steam superheater, 72, the steam reheater, 74, and the recirculating water preheater, 70, and are cooled by transfer of heat from the combustion gases through the walls of the tubes, 53, and through the walls of the other heaters into the water on the steam side of these various heat exchangers. In consequence these combustion gases can be sufficiently cooled in this way as to be safely admitted into presently available expander engine inlets without damaging the engine. By cooling the complete combustion gases in this way, we need only use an excess air amount inside the containers sufficient to achieve essentially complete burning of the char fuel to carbon dioxide and water. Thus, no additional excess air is needed for the purpose of cooling the combustion gases down to a safe value of expander inlet temperature. In consequence, the compressor and expander losses due to use of excess air for cooling are avoided and the efficiency of net power production by the cyclic Velox boiler can thus be greater than that of a conventional combined cycle gas turbine engine. This is one of the beneficial objects of this invention.

(9) The steam generated by a cyclic Velox boiler can be used for any of various purposes but is especially well suited for use with a steam turbine engine power cycle to generate additional work output. In this way, a combined cycle power plant is created by using a cyclic Velox boiler of this invention which can burn lump coal or other char fuel in a fixed fuel bed without ash particle carryover into the expander engine. Fuel bed channeling problems of usual steady pressure fixed fuel bed coal burners are avoided since the char fuel burns inside its pores during compression with air. These abilities of a cyclic Velox boiler to burn lump coal in a fixed bed without ash particle carryover and without fuel bed channeling problems are additional beneficial objects of this invention.

(10) Refueling of containers and ash removal therefrom are preferably carried out only when the containers are not connected to either the compressor or the expander. As a result, the pressure inside the container at refuel and coke removal can be low and essentially atmospheric, thus reducing the problems of operation and maintenance of the refuel transfer means and the coke removal transfer means as compared to those encountered with containers operated at high and steady pressures. This low pressure refueling and ash removal are still another beneficial object of this cyclic Velox boiler invention.

(11) The steam separator, 65, and recirculator, 69, scheme shown in FIG. 1 will often be preferred as relatively simple, with radiant heaters connected in parallel and with a high flow rate of water recirculation. With this scheme, the flow rate can be essentially equal to each radiant heater and adjustment of the flow distributors, 61, is not needed. But such separator and recirculator systems can only be used at steam boiler pressures sufficiently below the critical pressure of water that the density difference between liquid water and steam is sufficient that separation can be accomplished in the separator means, such as a steam drum, 65. At steam boiler pressures near or above the critical pressure of water, such steam separator and liquid recirculator schemes cannot be used.

Another particular example of a cyclic Velox boiler plant is shown schematically in FIG. 5 and comprises:

a. The single stage air compressor, 87, with drive motor, 88, compresses air from its inlet, 89, via its outlet, 90, into the container, 91, being compressed via its changeable gas flow connection, 92.

b. The single stage expander, 93, with power absorbing generator, 94, receives complete combustion gases into its inlet, 95, from the container, 96, being expanded via its changeable gas flow connection, 97, and exhausts fully expanded gases via its exhaust, 98.

c. When the container, 91, is fully compressed to the set value of maximum compression pressure, the two containers, 91, and, 96, exchange function by closure of the changeable gas flow connections, 92, and, 97, and opening of the changeable gas flow connections, 99, and, 100, and the next time period commences at the end of which the containers, 91, 96, again exchange function.

d. Where only two containers are used as shown in FIG. 5, refueling and ash removal can occur at small pressures as, for example, by refueling and removing ashes, following expansion during the early part of compression when pressures are not yet very high.

e. The containers, 91, 96, are fitted with radiant heater sections positioned on the interior surface of each container, as shown, for example, in FIG. 3 and described hereinabove, and with radiant heater liquid water inlets, 101, 102, and radiant heater water outlets, 103, 104.

f. From a source of boiler feedwater, 105, the feedwater pump and drive means, 106, pumps liquid water against the boiler steam pressure into the liquid water inlet, 101, of the radiant heater inside container, 91, via the changeable water flow connection, 107.

g. The steam superheater section, 108, receives steam from the radiant heater section inside containers, 96, or, 91, via its water outlet, 104, or, 103, and the changeable water flow connection, 109, or, 114, and discharges superheated steam to users via the steam delivery pipe, 110.

h. Other changeable water flow connections, 113, 115, are opened so that the water pumped by the feedwater pump, 106, into the radiant heater inside container, 91, flows from its outlet, 103, via the changeable water flow connections, 115, and, 113, into the liquid water inlet, 102, of the radiant heater inside container, 96.

i. At the start of the second time period when the changeable gas flow connections, 92, 97, are closed and, 99, 100, opened so that container, 96, is being compressed while container, 91, is being expanded, concurrently the changeable water flow connections, 107, 113, 109, 115, are closed and the changeable water flow connections, 112, 116, 111, 114, are opened. In this way, the two radiant heaters are always connected in series and with the feedwater flowing into that radiant heater inside the container being compressed and with steam flowing out of that radiant heater inside the container being expanded.

j. The changeable gas flow connections, 92, 97, 99, 100, and the changeable water flow connections, 107, 109, 111, 112, 113, 114, 115, 116, are thusly concurrently opened and closed by means for opening and closing which are controlled by a control means. The gas flow and steam flow connections can be thusly changed at fixed time intervals in which case the control means can be a timer. Alternatively, the gas flow and steam flow connections can be thusly changed whenever the container being compressed reaches a set value of maximum pressure in which case the control means comprises a pressure sensor and control means operative upon the means for opening and closing the changeable gas flow connections, such as is described hereinafter. Other control schemes can also be utilized.

k. When the radiant heaters are thusly connected in series, the individual tubes or water passages on the steam side of a single radiant heater may also be connected in series. Alternatively, the individual tubes or water passages on the steam side of a single radiant heater may be connected in parallel. When the several tubes of a single radiant heater are thusly connected in parallel flow distribution adjustors may be preferred on the tubes to obtain an essentially equal distribution of water between the several tubes in parallel. An example of such flow adjustors, 117, 118, 119, 120, is shown schematically in FIG. 6 for several radiant heater tubes, 53, only some of which are shown partially in this FIG. 6. These flow adjustors, 117, 118, 119, 120, can be hand adjusted to secure the desired degree of equality of water flow into each of the tubes, 53, of the single radiant heater.

The operation of the FIG. 5 exmaple cyclic Velox boiler plant is essentially similar to that already described for the cyclic Velox boiler plant of FIG. 1, the important difference being the water flow pattern through the radiant heater section, as described above, and the absence of a steam separator and liquid recirculator. Hence, the steam boiler of FIG. 5 is a once-through type of boiler and can be used at boiler steam pressures near and above the critical pressure of water since a density difference between the liquid water and the steam inside the boiler is not needed for proper operation of this boiler type.

In the majority of applications of cyclic Velox boilers, complete combustion of the char fuel to carbon dioxide will be preferred as described in the foregoing example plants. In some applications, however, only gasification of the char fuel to carbon monoxide or, if combustion steam is used, to carbon monoxide and hydrogen, will be desired. This gasification only result can be readily achieved by having the containers fully occupied with porous char fuel. Thus, with no appreciable dead space inside the containers for holding secondary air, the secondary burning reaction of carbon monoxide and hydrogen emerging from the char pores during expansion will not occur and only the gasification reaction will take place.

Char fuel burning via the cyclic compression and expansion used in this invention utilizes substantially all of the internal pore area of the fuel for carrying out burning. As a result, very high burn rates can be obtained from moderately sized fuel volumes. This high burn rate per unit volume is much greater than can be achieved on grates where burning occurs largely on only the external area, rather than the pore area, of the char fuel chunks. This is another beneficial object of this invention that very high char fuel burn rates per unit volume can be achieved.

D. DETAILS OF VARIOUS ELEMENTS

Combustion steam can be used in cyclic oxidation char gasifiers as a means of controlling expander inlet temperatures of safe values but cannot be used for this purpose when complete combustion of the char fuel is taking place in the containers. Nevertheless, combustion steam can be useful with complete char combustion as a means of adjusting the distribution of heat transfer between the radiant heaters and those convection heaters on expander inlets. As combustion steam flow is increased relative to air flow into containers, less energy is released by the primary reaction to carbon monoxide and hydrogen inside the char pores, and more energy is released by the secondary reaction to carbon dioxide and water outside the char pores. As a result, radiation heat transfer is reduced and convection heat transfer increased when the steam to oxygen ratio of the reactant gases going into the containers is increased. This heat transfer distribution control can be used in various ways as, for example, for control of final steam superheat temperature. For example, the secondary steam superheater, 72, of FIG. 1, can experience greater heat transfer and hence produce higher steam superheat when the flow of combustion steam into containers, 12, 13, which are being compressed by the higher pressure stages, 3, 4, of the compressor, 1, via the delivery means, 32, 33, is increased. In similar fashion steam superheat can be reduced by decreasing the flow of combustion steam. An example of one means for controlling steam superheat is shown diagrammatically in FIG. 7 and comprises a steam pressure regulator, 182, which sets the pressure of combustion steam from a high pressure steam source, 31, acting on the delivery orifices, 32, 33, which deliver steam into the connected containers, 12, 13. Usually, the steam source will be the cyclic Velox boiler itself but other surfaces could be used. As the steam pressure is increased, more steam is delivered and vice versa. The steam flowing into any one of the connected containers, and hence the steam to oxygen ratio, is determined in part by the area of the delivery orifice and in part by the upstream orifice pressure set by the pressure regulating valve, 182, more steam flowing at larger areas and higher pressures. The orifices, 32, 33, can be differently sized in order to achieve either an essentially constant steam to oxygen ratio during compression with oxygen containing gases or an increase in steam to oxygen ratio as container pressure increases. A vapor pressure temperature sensor, 183, is located in the outlet, 73, of the final superheater, 72, and acts via the sealed bellows, 184, spring, 185, and link, 186, to open the increase valve, 187, when superheated steam temperature is too low, and to open the decrease valve, 188, when superheated steam temperature is too high, these two valves being spring closed. The steam pressure regulating valve, 182, functions to maintain its downstream pressure upon the orifices, 32, 33, essentially equal to the pressure applied by a regulating gas to its regulating chamber, 190. The increase valve, 187, when open admits high pressure regulating gas from a source, 191, via an orifice, 192, to the regulating chamber, 190, and thus acts to increase steam pressure on the orifices and hence acts to increase steam flow rates and to increase superheated steam temperature. The decrease valve, 188, when open bleeds gas out of the regulating chamber, 190, via an orifice, 193, and thus acts to decrease steam pressure on the orifices and hence acts to decrease steam flow rates and decrease superheated steam temperature. In this way, the control scheme of FIG. 7 functions to control superheated steam temperature. A vapor pressure temperature sensor, 183, is shown in FIG. 7 but other temperature sensors, such as thermocouples with electrical control circuits, gas pressure sensors, or bimetallic temperature sensors, could alternatively be used. A hand-adjusted steam pressure regulating valve could be substituted for the automatic steam pressure regulating valve shown in FIG. 7, when hand control of superheated steam temperature was preferred. In general, for superheated steam control, we seek to control the combustion steam flow into those reactant gases which will subsequently flow as combustion gases through the steam superheater. For this FIG. 1 example case, it is the air and steam which last enter the containers from the outlet, 7, of the highest pressure compressor stage which will subsequently first enter the high pressure expander stage, 20, via the gas side of the final steam superheater, 72.

Where a steam reheater is used at one of the expander inlets, the combustion steam can also be used as a means of controlling the final temperature of the reheated steam. For example, the reheater, 74, of FIG. 1 is heated by expanding combustion gases leaving that container, which is connected to the second stage, 19, of the expander, 17. These particular expanding combustion gases will contain the air and steam compressed originally into char pores while a container was connected to the second compressor stage, 3, provided that the number of compressor stages equals the number of expander stages as shown in FIG. 1 and that the pressure rises per compressor stage correspond about equally and symmetrically with the pressure drops per expander stage. Hence, as combustion steam flow is increased through steam delivery means, 32, more heat is transferred via the convector, 74, and reheated steam temperature is increased. The opposite effects occur when combustion steam flow is decreased. In general for reheated steam temperature control, we seek to control the combustion steam flow into those reactant gases which will subsequently flow as combustion gases through the steam reheater. For the FIG. 1 example case, it is the air and steam which enter the containers from the outlet, 6, of the intermediate pressure compressor stage, 3, which will subsequently enter the intermediate pressure expander stage, 19, via the gas side of the steam reheater, 74. The steam flow controller for this reheat control can be similar to that described for superheat control if separate therefrom. Alternatively, an orifice area proportioning scheme can be used to proportion combustion steam flow between those gases going into the superheater and those gases going into the reheater.

A refuel mechanism is needed as a means for adding fresh char fuel into the container to replace that gasified. A wide variety of devices can be used as this refuel mechanism and several of these are described in the cross-referenced related application. An example of a pneumatically actuated refuel mechanism is shown in FIG. 3 as mounted on the top of the sealed pressure vessel container, 11, and connecting a fresh char fuel supply hopper, 247, to said container. This example pneumatic refuel mechanism comprises a refuel valve, 45, a refuel piston, 248, working in a refuel cylinder, 249, within the refuel valve body, a pneumatic pressure supply hole, 250, and pressure sealing means, 251. Not shown in FIG. 3 are, a means for rotating the refuel valve body, 45, through an arc of 180 degrees about a horizontal axis, as by hand or automatically via a pneumatically actuated crank, and a control valve to control admission and release of high pressure pneumatic gas via the pressure supply hole, 250, to the refuel cylinder, 249, where the gas pressure can act on the refuel piston, 248. As shown in FIG. 3, the refuel valve, 45, has positioned the refuel piston, 248, in contact with the supply hopper, 247, so that, by release of pressure from the refuel cylinder, 249, a charge of fresh char fuel will enter the refuel valve under the action of the weight of the loose char fuel in the supply hopper. When refueling is to take place, the refuel valve, 45, is rotated through a 180 degree arc to position the refuel piston in contact with the interior of the container, 11, and refueling is accomplished by application of pneumatic pressure to the refuel piston, 248, via the pressure supply hole, 250, from the control valve, this pressure then causing the refuel piston, 248, to force the fresh char fuel into the container, 11. When refueling is completed the refuel valve, 45, is rotated through a 180 degree arc to return it to the position shown in FIG. 3 where the pressure sealing means, 251, seals the refuel end of the container, 11, against gas leakage. Preferably, the above-described refueling process is carried out when the container is at minimum cycle pressure in order to minimize gas leakage from the container and, with this preferred refuel timing, compressed reactant gas or reacted gas can be used as the source of high pressure pneumatic gas for actuation of the refuel mechanism. Alternatively, other sources of high-pressure gas can be used for actuation or hydraulic actuation can be used also. The refuel mechanism shown in FIG. 3 can refuel with a char volume equal to the maximum displacement of the refuel piston, 248, in the refuel cylinder, 249. This maximum displacement of each refuel mechanism is at least equal to the maximum required char refuel volume.

While the time interval between refuelings, tf, can in principle have almost any value, it is usually preferable to refuel each container when it is at minimum cycle pressure at the end of an expansion and before starting the next compression in order to minimize leakage of reactant and reacted gases. Hence, we prefer to refuel each container at most once for each cycle of compression followed by expansion and for this case the refuel time interval, tf, is determined by the cycle time interval, tc, for carrying out one full cycle of compression and expansion on one container, and the number of active containers, na, equal to the sum of the number of containers being compressed, nc, plus the number of containers being expanded, nx.

$$tf = \frac{(tc)}{(nc + nx)} (Z)$$

Wherein the refuel ratio Z is any positive integer. The total number of containers, nt, may exceed the number of active containers, na, by at least one so that the inactive containers can be refueled, and have coke removed, if desired, in a leisurely manner and at low pressures of the containers, before being returned again to an active cycle of compression followed by expansion. Of course, for an oxidation gasifier, refueling and coke removal cannot be too leisurely or the char fuel within a container will cool down below its rapid reaction temperature. For any one container the time interval between refuelings, tfl, for this case with extra, inactive containers, is then the product of the total number of containers, nt, and the time interval between refuelings, tf.

Various methods of controlling the initiation of refueling can be used. For example, the disconnecting of a container from the last stage of the expander could initiate the refuel mechanism to carry out one refueling operation, and in this case the integer, Z, would be one. Where values of Z other than one are to be used, a mechanical or electrical counter can count up the number of compression and expansion cycles each container experiences. When the set number of cycles, which equals Z, is reached the counter then initiates the refuel mechanism when the container disconnects from the last stage of the expander, and resets itself to start counting cycles again. The set number of cycles, and hence Z, can be made adjustable in integral steps and provides a means for adjusting the maximum char refueling rate available. Other methods of initiating the refuel mechanism can also be used.

One example means for connecting the refuel mechanism is shown in FIG. 8 and comprises the refuel shaft, 135, which rotates the refuel valve, 45, of FIG. 3, the refuel shaft gear, 136, driven by the refuel lever and gear, 137, which is, in turn, driven by the piston, 138, and cylinder, 139. The arc of motion of the refuel lever, 137, between the stops, 140, 141, and the pitch diameter ratio of the refuel shaft gear, 136, and the lever gear, 137, are selected to assure that the refuel shaft, 135, and hence the refuel valve, 45, are rotated through a half turn when the refuel lever, 137, moves from the stop, 140, to the stop, 141. The moving port, 142, rotates with the refuel gear, 136, and connects via the passage, 143, in the shaft, 135, to the driving side of the refuel piston, 248, of FIG. 3, and connects at its other end either to the atmospheric vent, 144, as positioned in FIG. 8, or to the high pressure driving gas supply via the passage, 145, when rotated a half turn as when the lever, 137, is against the stop, 141. As shown in FIG. 8, the refuel shaft, 135, and the refuel valve, 45, are in the disconnected position shown in FIG. 3 with char fuel from the hopper, 247, reloading into the refuel valve, 45, and the side, 146, of the piston, 138, is vented to atmosphere via the valve, 147, and the side, 148, of the piston, 138, is connected to the high pressure driving gas via the valve, 147, and the pipe, 149, thus holding the lever, 137, against the stop, 140. To connect the refuel mechanism the refuel solenoid, DRF, is energized via the electrical connection, T2, and the refuel interrupter switch, 121, thus rotating the valve, 147, through a quarter turn against the return spring, 150, and applying high pressure to the side, 146, of the piston, 138, and atmospheric pressure to the side, 148, of the piston, 138, so that the piston, 138, moves the lever, 137, against the stop, 141, thus rotating the refuel valve, 45, into the refueling position and also applying high pressure driving gas via the passage, 145, to the refuel piston, 248, so that fresh char fuel is forced into the container, 11. When the refuel solenoid, DRF, is next de-energized the pressures on the piston, 138, are again reversed and the piston, 138, lever, 137, shaft, 135, are all returned to their position shown in FIG. 8, and a refueling process has been completed. A refueling process may be thusly carried out by hand via the switch, 156, or preferably automatically via the connection, T2, from the cycle time interval controller to be described hereinafter. The hand switch, 156, can be used during startup to fill the container with char fuel by repeatedly carrying out refuel processes. The refuel interrupter switch can be opened and closed by the char fuel and ash pile quantity sensor and control means shown schematically in FIG. 9 whose upper limit sensor input, 122, is from the char fuel pile upper sensor, 46, at ha of FIG. 3, and whose lower limit sensor input, 123, is from the char fuel pile lower sensor, 46, at hb of FIG. 3. Thus, when the coal and ash pile inside the container, 11, is above the upper limit, ha, the controller, 124, opens the interrupter, 121, and the refuel transfer means will not be connected to the container during refuel intervals. When the coal and ash pile drops below the lower limit, hb, the controller, 124, closes the interrupter, 121, and the refuel transfer means will then be connected to the container and refueling will occur whenever that container reaches a refuel time interval. In this way, the coal and ash pile quantity sensor and control means shown in FIGS. 3, 9, and, 8, functions to keep the coal and ash pile height between the upper limit, ha, and the lower limit, hb. Electric power is supplied to the sensors, controller and interrupter via the connections, 125.

A coke removal mechanism can also be used with oxidation gasifiers where it is desired to remove partially oxidized char fuel from the containers as a coke product output. Even for those oxidation gasifiers where the input char fuel is to be fully oxidized to gases, a coke removal mechanism will still be needed in most cases with sealed pressure vessel containers as a means for removing the ashes and is then an ash removal mechanism. Whether used for removal of partially oxidized char, or fully oxidized ashes, all such mechanisms are herein and in the claims referred to as coke removal mechanisms and constitute a means for removing a volume of solid materials from the containing means. A wide variety of devices can be used as this coke removal mechanism and several of these are described in the cross-referenced related applications wherein they are called ash removal mechanisms. Where char fuels of extremely low ash content are to be fully oxidized, ash removal can be carried out by hand whenever the plant is shut down but such a coke removal means limits the plant to only such char fuels of which there are very few. Usually, a coke removal means will be preferred capable of removing ashes while the plant is operating. An example of a pneumatically actuated coke removal mechanism is shown in FIG. 3 as mounted on the bottom of a sealed pressure vessel container, 11, and connecting the container interior to a coke discharge pipe, 252. This example pneumatic coke removal mechanism comprises a removal valve, 50, a removal piston, 253, working in a removal cylinder, 254, within the removal valve body, a pneumatic pressure supply hole, 255, and pressure sealing means, 256. Not shown in FIG. 3 are, a means for rotating the removal valve body, 50, through an arc of 180 degrees about a horizontal axis, as by hand or automatically as via a pneumatically actuated crank, and a control valve to control admission and release of high pressure pneumatic gas via the pressure supply hole, 255, to the removal cylinder, 254, where the gas pressure can act to move the removal piston, 253. This example pneumatic coke removal mechanism is similar to the aforedescribed refuel mechanism and the similarly named components function in a similar manner except that the coke removal mechanism removes a volume of material from the container interior whereas the refuel mechanism adds a volume of material to the container interior.

Just as for refueling we also prefer to remove coke only when the containers are at minimum cycle pressure and hence, for this preferred case, the time interval between coke removals, tfr, is given by the following relation, similarly to that for the corresponding preferred refuel time interval, tf.

$$(tfr) = \left( \frac{tc}{nc + nx} \right) y$$

Wherein the coke removal ratio y is any positive integer.

For oxidation gasifiers the coke removal mechanism can function to remove partially oxidized char fuel as an output coke product, if desired, or alternatively can remove only the ashes when the char fuel input is to be fully oxidized to gaseous products.

Just as for the refuel mechanism, various methods of controlling the initiation and timing of coke removal can be used. As a preferred example case coke removal occurs only when the containers are at minimum cycle pressure and following next after a refueling. In this preferred way, gas leakage is minimized and the force of refueling acts to force ashes into filling the coke removal mechanism just before coke removal takes place.

Where only ashes are to be removed, the mass and volume of ashes to be removed by the coke removal mechanism are much smaller than the mass and volume of char fuel to be refueled by the refuel mechanism. This volume difference could be accommodated by designing the coke removal mechanism of a smaller size than the refuel mechanism, but then a gasifier so equipped would be impractical to utilize subsequently for production of partially oxidized coke product. When operating with full char oxidation to ashes, the actual coke removal rate can be reduced to the ash formation rate by reducing the frequency of coke removal relative to the frequency of refueling. For the particular example refuel and coke removal mechanisms shown in FIG. 3 and for preferred coke removal and refuel occurring only at minimum cycle pressure, the aforedescribed decrease of coke removal frequency can be accomplished by increasing the integer, y. This control of y can be done by hand or preferably automatically as ashes accumulate. For example, ash level sensor schemes can be used, as described in the cross-referenced related application, to sense when the ash level is well inside the container from the coke removal mechanism and this sensing signal can then cause a coke removal process to take place just after the next refueling process. In this way, ash removal occurs automatically and in a manner to assure that only fully oxidized ashes are removed. Thermocouple temperature sensors, 52, are shown in FIG. 3 as an example ash level sensor to detect when the ashes have accumulated up to the levels of these thermocouples, and hence are well above the coke removal mechanism, by sensing the drop in temperature when the adjacent solid ashes are no longer reacting because it has been as fully oxidized as possible. The coke removal interrupter, 131, and control can be used and can operate similarly to the refuel interrupter and control of FIG. 9 except that the sensor inputs are from the upper ash pile sensor, 52, at 1a of FIG. 3, and the lower ash pile sensor, 52, at 1b of FIG. 3. In a manner similar to the action of the coal and ash pile quantity sensor and control, the ash pile quantity sensor and control functions to keep the ash pile level between the upper limit, 1a, and the lower limit, 1b.

Each container can be fitted with a refuel mechanism and a coke removal mechanism, as is shown for example in FIG. 3, or alternatively all containers can be refueled and have coke removed by use of one or a few refuel mechanisms and one or a few coke removal mechanisms which are connected, in turn, to the containers when refueling and coke removal are to occur. Each container in this case would be fitted with a means for sealing the refuel port and the coke removal port when these were not in use. The step of initiating a refuel or coke removal process for a container or of connecting the container to a refuel or coke removal mechanism for this purpose is herein and in the claims referred to as connecting to a refuel or coke removal mechanism.

The interrupter switches, 121, 131, can be placed in the refuel solenoid, RF, circuits and in the coke removal solenoid, CR, circuits of the control means for controlling the means for opening and closing the changeable gas flow connections and for controlling the refuel connecting means and the coke removal connecting means shown schematically in FIGS. 10 and 11.

One example scheme for control of cycle time is shown schematically in FIGS. 10 and 11. A char gasifier plant comprising a two-stage compressor and a two-stage expander is used for FIG. 10 and comprises six containers, A, B, C, D, E, F, with two containers connected to the two compressor stages, with two containers connected to the two expander stages, with one container being refueled and with one container having coke removed during any one time period in the sequence of time periods of open gas flow connections. Each container is fitted with a pressure actuated switch, SA, SB, SC, SD, SE, SF, which closes when the gas pressure inside the container reaches the intended value of maximum compression pressure, PM. Each container is fitted with four changeable gas flow connections, a refuel mechanism connection, and a coke removal mechanism connection so there are twenty-four changeable gas flow connections, six refuel mechanism connections and six coke removal mechanism connections. These connections for container, A, are shown schematically in FIG. 10 as follows:

AC1, changeable gas flow connection to the lowest pressure compressor stage;
AC2, changeable gas flow connection to the highest pressure compressor stage;
AX1, changeable gas flow connection to the highest pressure expander stage;
AX2, changeable gas flow connection to the lowest pressure expander stage;
ARF, refuel mechanism connecting means;
ACR, coke removal mechanism connecting means.

These same changeable gas flow connections and refuel mechanism connections and coke removal mechanism connections for the other five (5) containers are also shown on FIG. 10 and are similarly designated except the first designator letter is changed to correspond to the container designator. For the example scheme of FIG. 10, the changeable gas flow connections are opened by applying electric power to a solenoid opened valve and these valves are closed by a closing spring. The refuel mechanism and the coke removal mechanism are also solenoid initiated as shown, for example, in FIGS. 8 and 9. Thus, when electric power from the solenoid power source, SP, is applied to the terminal T1 of FIG. 10, the containers will then be connected as follows:

Container A open gas flow connected to the delivery end of the lowest pressure compressor stage;
Container B open gas flow connected to the delivery end of the highest pressure compressor stage;
Container C open gas flow connected to the inlet end of the highest pressure expander stage;
Container D open gas flow connected to the inlet end of the lowest pressure expander stage;
Container E connectable to refuel mechanism if refuel interrupter, 121, is closed;
Container F connectable to coke removal mechanism if coke removal interrupter, 131, is closed.

By applying the solenoid power source, SP, for a time period to each of the terminals T1, T2, T3, T4, T5, T6, and in that sequence, it can be seen that each of the containers shown in FIG. 10 will be carried through the desired sequence as follows:

a sub sequence of time periods of open gas flow connections to each delivery end of each stage of the compressor in order of increasing stage delivery pressure;
a sub sequence of time periods of open gas flow connections to each inlet end of each stage of the expander in order of decreasing stage inlet pressure;
a time period connectable to the refuel mechanism;
a time period connectable to the coke removal mechanism;

and this sequence can be repeated by repeating the application of the power source, SP, to the terminals, T1, T2, T3, T4, T5, T6. Note also for the wiring diagram as shown in FIG. 10 that each container is opened to only one stage during any one time period and that each delivery end of each stage of the compressor and each inlet end of each stage of the expander has an open gas flow connection to a container during all time periods, provided that only one of the terminals, T1, T2, T3, T4, T5, T6, receives power during any one time period. The solenoid power source, SP, is applied to each of the terminals, T1, T2, T3, T4, T5, T6, in turn, and one at a time in that sequence, by action of the pressure switches, SA, SB, SC, SD, SE, SF, via the cascaded relays shown schematically in FIG. 11, wherein only three, R1, R2, R3, of the six cascaded relays are shown.

Each cascade relay, such as R1, comprises a single coil solenoid switch, S1, with upper switch terminals, 257, closed when energized and with lower switch terminals, 258, closed when deenergized, and a double coil solenoid switch, D1, with two separate switch terminals, 259, 260, closed when energized, switch terminals, 257, 259, and 260 being spring opened. As shown in FIG. 11, the terminal T1 is connected to SP via the terminals, 261, of single coil switch, S2, and the switch terminals, 260 and one coil of D1 and the coil of S1 are also energized thusly. During the time period when T1 is thusly energized from SP, it is container B which is being pumped up to maximum compression pressure, and it is the pressure switch, SB, on container B which is connected to the double coil switch, D2, of cascade relay R2 via switch terminals 259 and 257. When container B reaches the value of maximum compression pressure, PM, set into the pressure switch, SB, this switch closes and applies power from source PP to one coil of the double coil switch D2 which thus closes switches, 262, 263, energizes single coil switch, S2, and closes switch terminal, 264, and opens switch terminals, 261, and disconnects solenoid power source SP from terminal T1, and then connects solenoid power source SP to terminal T2. A first time period of the sequence will thus end and the next time period commence during which container B will now be connected to the highest pressure expander stage and it will be container A, now connected to the highest pressure compressor stage, whose pressure switch, SA, will next act to end the time period. When single coil switch S2 was energized and switch terminals 261 were opened, the double coil switch D1 and the single coil switch S1 were deenergized, thus opening switch terminals 259, 260, and 257 and thus the pressure switch, SB, is also disconnected, but the double coil switch D2 is now energized via the switch terminals 263 and the switch terminals, 265, of single coil switch S3 of relay R3. Accordingly, cascade relay R2 is now arranged during the second time period in the same way as cascade relay R1 was during the first time period and thus when container A is pumped up to the set value of maximum compression pressure, the same events will take place and thus disconnect power from T2, apply power to T3, disconnect pressure switch SA, connect pressure switch SF, and thus change over to a third time period. The cascade relay system shown in FIG. 11 thus applies solenoid power to the terminals T1, T2, T3, T4, T5, T6, in turn and in that sequence and, since cascade relay R6 connects similarly into cascade relay R1, this sequence of connections is repeated again and again. In this way, the desired sequence of open gas flow connectings and refuel and coke removal connectings is carried out for each container, and is repeated, and each container is brought up to the desired maximum pressure of compression before being expanded. The desired maximum pressure of compression is set by adjusting, as by hand, the closing pressures of the several pressure switches SA, SB, SC, SD, SE, SF. For startup a pressure switch bypass switch, SS, can set any one of the cascade relays, say R3, and when the compressor and expander are started up, the sequence can commence soon thereafter. A wide variety of cascade relay systems and pressure switch systems can also be used to carry out the desired sequence and FIGS. 10 and 11 are only intended as a typical illustrative example. Electronic control schemes can be substituted for this cascade relay scheme as is well known in the art of electronic controls.

The aforedescribed scheme for control of cycle time is seen to comprise the following:

a. means for opening and closing the changeable gas flow connections, in the form of the solenoids and return springs on the valves such as AC1, AC2, BX1, BX2, etc., together with the solenoid power source, the pressure switches, and the cascade of relays;

b. means for connecting and disconnecting the refuel mechanism, in the form of the refuel initiating solenoids, such as ARF, and connected linkage, together with the solenoid power source and the refuel interrupter switch and control;

c. means for connecting and disconnecting the coke removal mechanism, in the form of the coke removal initiating solenoids, such as ACR, and connected linkage, together with the solenoid power source, and the coke removal interrupter switch and control;

d. means for controlling the above means for opening and closing and means for connecting and disconnecting so that each container goes through the desired sequence of open gas flow connections, and time period for refueling, and time period for coke removal, in a continuous series of time periods, and so that each compressor stage delivery and each expander stage inlet always has a container connected, in the form of the grouping of the solenoids connected to the terminals T1, T2, T3, T4, T5, T6, and the cascade of relays.

Where a constant cycle time is preferred, the aforedescribed scheme can be modified by replacing the pressure switches and cascade relays by a motor-driven switch which directs electric power to the terminals T1, T2, T3, T4, T5, T6, in the desired sequence. The speed of the switch drive motor can then be adjusted so that the desired maximum pressure of compression is reached. This motor speed adjustment can be done by hand or automatically.

One example pneumatic-hydraulic scheme for control of cycle time is shown schematically in FIGS. 16 and 17. In lieu of the solenoid operated changeable gas flow connections of the FIG. 10 and 11 cycle time control scheme, pneumatically operated valves are used for AC1, BC2, CX1, DX2, etc., of which only one, say AC1, is shown in FIG. 16. The valve, 266, is opened or closed by applying pneumatic pressure to the open face, 267, or the close face, 268, respectively, of the drive piston, 269, while venting the opposite face via the pipes, 270, and, 271. Pneumatic pressure and venting are applied to the pipes, 270, 271, as well as the corresponding pipes of the other valves or actuators in the group to be simultaneously opened or closed, by the cam driven spool valve, 272, which is moved up by the lifted section, 273, of the cam, 274, and is moved down by the return spring, 275. As shown in FIG. 16, the spool valve, 272, is up on the cam lifted section, 273, and pneumatic pressure from pneumatic pressure supply pipe, 276, is applied via pipe, 270, to the open faces, 267, of the drive pistons, or other actuators such as for refuel or coke removal, while the close faces are vented via the vent, 277, and the valves, 266, is thus opened. When the cam moves on the spring, 275, will subsequently force the spool valve follower, 278, back on to the cam base circle, 279, and pneumatic pressure will then be applied via pipe, 271, to the close faces, 268, of the pistons, 269, while the open faces, 267, will be vented via the vent, 280, and the valves, 266, will then be closed. Each set of valves and actuators which are to be simultaneously opened or closed will require its own spool valve such as, 272, but all can be driven by the same cam, 274, if properly spaced angularly thereabout or, alternatively, each spool valve can be driven by its own cam. In either case, the spool valves and cams must be so arranged that one set of valves is closed when the next set of valves in the sequence is opened. Hence, the time interval between changes of connectings, tcc, in minutes equals the arc length, in degrees, of the lifted section, 273, divided by 360 times the revolutions per minute of the cam, 274. A fixed cam speed will yield a fixed value of tcc and hence also of tc. But tcc and tc can be adjusted, if desired, by use of an adjustable speed cam drive mechanism such as the hydraulic drive scheme shown schematically in FIG. 17. An adjustable swash plate hydraulic pump, 281, is driven, as via a reduction gear box, 282, from the compressor shaft, 283, and the pump displacement can be adjusted by adjusting the swash plate via the pump control lever, 284. The hydraulic motor, 285, of fixed displacement, drives the spool valve cam, 274, and is itself driven via the pressure line, 286, from the pump, 281, hydraulic fluid return being via the pipes, 287, 288, and the fluid reservoir, 289. The hydraulic motor, 285, speed and hence the cam speed can be adjusted by adjusting the hydraulic pump, 281, displacement via the lever, 284, increasing pump displacement increasing motor speed and vice versa. Increasing pump displacement increases cam speed and hence shortens the cycle time and vice versa. In this way, the cycle time can be adjusted either by hand adjustment of the swash plate lever, 284, or automatically in response to container pressures reached during compression. One example automatic cam speed control device is also shown in FIG. 17 and comprises a piston, 290, which adjusts the swash plate lever, 284, an adjustable spring, 291, acting in opposition to gas pressure applied to the piston, 290, via the bleed check valve, 296, from the pipe, 292, the opposite piston face being vented to atmosphere via the passage, 293. The pipe, 292, connects to the highest pressure compressor stage delivery end. The bleed check valve, 296, allows ready flow of compressed gas into the cylinder, 294, but only a slow bleed of return flow out of the cylinder and hence the pressure in the cylinder, 294, will be reasonably steady and close to the maximum gas pressure experienced in the pipe, 292. Thus, as maximum container compression pressure rises, the piston, 290, moves the swash plate lever, 284, in the direction, 295, which increases pump displacement to speed up the motor, 285, and cam, 274, and hence to shorten the cycle time. As maximum container compression pressure decreases, the lever, 284, is moved in the direction, 297, which slows the cam, 274, and lengthens the cycle time. In this way, the devices shown in FIG. 17 can function to hold maximum compression pressure at or near a desired value and this desired value can be adjusted by adjustment of the spring control nut, 298. An adjustable speed electric motor could be substituted for the adjustable speed hydraulic drive.

Wholly mechanical cycle time interval controllers can also be used with the cams acting directly as valve actuators and refuel or coke removal actuators.

While the cycle time is determined by the rate at which the compressor can pump up the containers to the maximum cycle pressure, the expanders are required to expand the reacted gases within these containers back down to minimum cycle pressure within that portion of the cycle time available for expansion. This assurance of adequate expansion can be obtained by use of the expander flow rate controllers already described hereinabove. So that the time interval between changes of gas flow connectings, tcc, can be the same for all of the several containers in use on an oxidation gasifier with a multistage compressor, a multistage expander, and sealed pressure vessel containers, the ratio of container pressure rise across a single stage to the mass flow rate of all gases into the container connected to that stage shall be equal for all compressor stages, and further, the ratio of container pressure drop across a single stage to the mass flow rate of all gases out of the container connected to that stage shall be equal for all expander stages.

One example of an expander flow rate control scheme is shown diagramatically in FIG. 18 wherein an expander inlet pipe, 299, supplies reacted gas from connected containers to the adjustable, non-rotating inlet nozzle guide vanes, 300, which direct the expanding reactant gases against the rotating turbine blades, 301, to produce work. The nozzle flow area between the inlet guide vanes, 300, can be adjusted by rotating these guide vanes about their pivots, 302, by the levers, 303, with each guide vane, 300, having a lever, 303, and these levers are connected together by links, 304, so that all inlet guide vanes are rotated together similarly. The levers, 303, are thusly rotated by the arm, 305, moved in turn by a nut fitting the threaded shaft, 306. The threaded shaft, 306, is rotated so as to open the nozzle flow area by the open motor, 307, and is rotated so as to close the nozzle flow area by the close motor, 308, these being electric motors and preferably constant speed electric motors. The expander inlet pipe, 299, is fitted with a high pressure cut in switch, 309, which closes whenever the inlet pressure exceeds the value set on this switch, and a low pressure cut in switch, 310, which closes whenever the inlet pressure is at or below the value set on this switch. The set value for the high pressure switch, 309, is set, as by hand, to equal or slightly exceed the intended maximum expander inlet pressure. The set value for the low pressure switch, 310, is set, as by hand, to equal or be slightly less than the intended minimum expander inlet pressure. Whenever expander inlet pressure exceeds the intended maximum pressure, the open motor, 307, is energized via the power source, 311, the high pressure switch, 309, and the open limit switch, 312, and the nozzle flow area is increased in order to empty the connected containers more quickly so that the intended minimum pressure will be reached during the time period available. The open limit switch, 312, prevents further nozzle opening after full opening has been reached and the lever, 305, has engaged and opened the limit switch, 312, preventing energizing of the open motor, 307. Whenever expander inlet pressure is below the intended minimum pressure, the close motor, 308, is energized via the power source, 311, the low pressure switch, 310, and the close limit switch, 313, and the nozzle flow area is decreased in order to decrease the rate of emptying of the next connected container so that the expander inlet pressure will not drop below the intended minimum pressure during the time period available. The close limit switch, 313, prevents further nozzle closing after maximum closing has been reached and the lever, 305, has engaged and opened the limit switch, 313, preventing energizing of the close motor, 308. This expander flow rate control scheme thus acts to assure that each container is expanded down to essentially the same desired minimum pressure within the time period available. An electrically energized expander flow rate controller is shown in FIG. 18 but hydraulic or pneumatic control schemes can also be used as is well known in the art of expander flow rate controllers. Nozzle flow area is controlled by the scheme shown in FIG. 18 but a similar control could act instead to adjust a throttle valve in the expander inlet pipe or to adjust the cut-off timing on a piston expander.

Chemical analysis of the complete combustion gases leaving the container during expansion can be used as an alternate sensor and control means for controlling the ash volume inside the container. As ash volume increases at essentially constant quantity of char fuel plus ashes, the char fuel quantity decreases, thus increasing the amount of oxygen gas unuseable and thus present in the expansion gases leaving the container. As ash volume decreases at essentially constant quantity of char fuel plus ashes, the char fuel quantity increases, thus decreasing the amount of oxygen gas unused until eventually some of the carbon monoxide emerging from the char pores remains unburned and is thus present in the expansion gases leaving the container. One example of such a chemical analysis type ash volume sensor and control scheme is shown schematically in FIG. 12 and comprises, a timed gas sampling valve, 126, and sample nozzle, 127, an automatic exhaust gas analyzer and controller, 128, an output to the coke removal interrupter switch, 131, and an operating power input, 129. The sampling valve is opened and closed by the solenoid and spring actuator, 130, which connects as shown into the solenoid energizing circuit of FIG. 10, with one sampling valve, 126, and actuator, 130, for each container. When a container, say B, connects to a selected expander stage, for example the last expander stage, at BX2 with solenoid power terminal T3 energized, the sample valve actuator, BS, for that container is also energized opening the sample valve, 126, and delivering a sample of the expansion gases to the exhaust gas analyzer and controller, 128. When the gas analyzer finds excess oxygen gas in the expansion gas, the controller closes the coke removal interrupter, 131, for that container, BCR, so that ashes will be removed at the next coke removal time interval, thus dropping the char and ash pile height and causing more char fuel to be added into that container. When the gas analyzer finds excess carbon monoxide in the expansion gas, the controller opens the coke removal interrupter, 131, for that container, BCR, and coke removal ceases causing ash volume to increase and thus decreasing the char fuel volume since char burnup continues. The levels of excess oxygen gas and excess carbon monoxide at which the controller acts thusly upon the coke removal interrupter, 131, can be set by the knobs, 132, 133. The sampling valve, 126, can be thusly opened when each container connects to any one selected expander stage, such as the last stage as described above, and the best timing for this sampling valve is preferably determined experimentally.

This ash volume sensor and coke removal control scheme using chemical analysis of the complete combustion gases leaving a container during expansion can alternatively be adopted for use as a direct char fuel volume sensor and refuel control scheme by holding a constant ash level with a separate ash level sensor and control such as described above previously instead of holding a constant char fuel and ash level as used for the above example. For this char fuel volume sensor application, the controller will act to close the refuel interrupter, 121, when the oxygen gas content exceeds a set value to cause refueling to occur, and will act to open the refuel interrupter, 121, when the carbon monoxide content exceeds a set value to prevent refueling. This direct char fuel volume sensor and control scheme may be preferred when ash removal occurs continuously in a molten state.

Use of the above-described chemical analysis schemes for control of char fuel volume and ash volume inside each container also provides a method for minimizing efficiency losses due to excess air or incomplete burning of carbon monoxide. Some excess air will be needed to assure essentially complete burning during secondary reaction of the carbon monoxide and hydrogen emerging from the char pores during expansion. But this excess air quantity needs to be minimized to reduce the resulting exhaust enthalpy losses and particularly to reduce the work losses due to compression and reexpansion of this excess air quantity. If we reduce the excess air quantity too greatly, losses due to incomplete burning of carbon monoxide will result. As char fuel volume, and hence pore volume, increases more air is reacted to carbon monoxide inside the pores and less excess air is available since the dead volume decreases. Thus, a maximum preferred char fuel volume exists above which appreciable unburned carbon monoxide will exist in the expansion gases and losses will result. As char fuel volume, and hence pore volume, decreases, less air is reacted to carbon monoxide by the primary reaction inside the pores and more excess air is available since the dead volume increases. Hence, a minimum preferred char fuel volume exists below which appreciable unneeded excess air is being used and losses will result. By sensing oxygen gas content and carbon monoxide content of the expansion gases and controlling the refuel and coke removal mechanisms as described above, these chemical analysis schemes can function to hold the char fuel volume between these preferred maximum and minimum values and thus to optimize plant efficiency.

These refuel and coke removal schemes described above are examples and other schemes can alternatively be used.

Where changeable water flow connections are used, as in some forms of the invention with radiant heaters in series as in FIG. 5, these and their means for opening and closing and their means for controlling the means for opening and closing can be essentially similar to the changeable gas flow connections and their means for opening and closing and their means for controlling the means for opening and closing as used on the cyclic oxidation char gasifier portion of the cyclic Velox boiler and as described in the application Ser. No. 06/328,148. The changeable water flow connection scheme can be entirely separate from the changeable gas flow connection scheme but the means for controlling is preferably combined since all changes of connections are to occur preferably at the same time. For example, the means for controlling the opening and closing of changeable gas flow connections shown in FIGS. 10 and 11 can be readily modified to also control the opening and closing of changeable water flow connections. This modification comprises connecting the means for opening and closing the changeable water flow connections between the solenoid power source ground and the solenoid power input terminals T1, T2, T3, T4, T5, T6, so that when these are energized in sequence via the cascade relay scheme, the changeable water flow connections are changed in sequence so as to always maintain the desired water flow direction through the series connected radiant heaters. The preferred water flow direction through series connected radiant heaters is with the water entering first that radiant heater whose container is connected to the first compressor stage outlet with the water flowing next in series through radiant heaters whose containers connect to compressor stages in the direction of increasing compressor stage delivery pressure. Thereafter, the water flow direction is preferably in series through radiant heaters whose containers connect to expander stages in the direction of increasing expander stage inlet pressure. In many cases extra containers are used, in excess of the sum of the number of expander stages plus the number of compressor stages, so that refuel and coke removal can occur at low pressure when a container is not connected to either a compressor outlet or an expander inlet. For these extra container cases, the coldest water is preferably passed first into those radiant heaters inside containers undergoing refueling and coke removal and the water flow direction then continues next into radiant heaters inside containers connected to compressor stages as described above.

Radiant heaters can also be connected in series with fixed water flow connections instead of changeable water flow connections and a simpler plant results. An example of such a fixed series connected radiant heaters cyclic Velox boiler plant is shown schematically in FIG. 13 and comprises: a compressor, 151, with three stages, 152, 153, 154, whose outlets, 155, 157, 158, connect via changeable gas flow connections, 159, 160, 161, to containers being compressed, 162, 163, 164; a low pressure expander, 165, with two stages, 166, 167, whose inlets, 169, 170, connect via changeable gas flow connections, 172, 173, to containers being expanded, 175, 176; a high pressure single stage expander, 168, whose inlet, 171, connects via the changeable gas flow connection, 174, to a container first being expanded, 177; a power means, 178; a compressor first stage inlet air density setting compressor and gas turbine drive means, 179; a feedwater pump and drive means, 180, with controller, 203; a feedwater heater, 181, on the low pressure expander exhaust; a convection heater, 189, on the high pressure expander exhaust; three convection heaters, 194, 195, 196, on the three expander inlets, 169, 170, 171, respectively; an extra container, 197, undergoing coke removal, and an extra container, 198, undergoing refueling; an exit boiler steam pressure sensor, 199, and an exit steam temperature sensor, 200; a gas pressure reducing valve, 201, with controller, 202. This cyclic Velox boiler shown in FIG. 13 is an example of a once-through boiler with the feedwater from a source, 204, being pumped against boiler pressure by the feedwater pump, 180, through the several heaters, all fixedly connected in series in the following direction: first throoough the feedwater heater, 181; then through the radiant heaters inside containers in the direction starting at container, 198, through containers, 197, 162, 163, 164, 175, 176, 177, and always in that order of containers independently of how these containers change their connections to the compressor outlets and refuel transfer means and coke removal transfer means and expander inlets; then through the high pressure expander exhaust convection heater, 189; then through the convection heater, 194, on the lowest pressure expander inlet, 169; then through the convection heater, 195, on the intermediate pressure expander inlet, 170; last through the convection heater, 196, on the highest pressure expander inlet, 171. The boiler pressure sensor, 199, acts via the controller, 202, and gas pressure reducing valve, 201, which admits expansion gases to drive the gas turbine drive of the intake compressor, 179, to increase compressor air intake density when steam pressure decreases below a set value and to decrease compressor air intake density when steam pressure increases above a set value. In this way, the char fuel burn rate is controlled to control boiler steam pressure. The boiler steam exit temperature sensor, 200, acts via the feedwater pump controller, 203, to increase feedwater flow when the steam temperature exceeds a set value and to decrease feedwater flow when the steam temperature drops below a set value. In this way, the exit steam temperature is controlled within set limits. This fixed series connected once through cyclic Velox boiler of FIG. 13 can be used at any steam pressure including pressures at or above the critical pressure of water.

Where the several radiant heaters are in parallel a sensor, to measure steam enthalpy at each radiant heater steam outlet, acting via a control means to control the distribution of water flow to that radiant heater may be preferred on each radiant heater especially where water flow through radiant heaters is not large as, for example, with once-through boilers. One example of such a steam enthalpy sensor and flow distribution controller is shown schematically in FIG. 14 and comprises: a tube wall temperature sensor, 205, mounted in one or more of the radiant heater tubes, 53, on a portion thereof which views the burning char fuel pile; a controller, 206, responsive to the tube wall temperature sensor, 205, and operative upon the opener and closer means, 207, of the flow distributor valve, 208; a flow distributor valve, 208, which adjusts the flow area, 209, through which water enters the radiant heater inlet, 55, and hence the flow rate of water distributed to the radiant heater; a bypass flow passage, 210, which assures that some water always flows to each radiant heater section inlet, 55. The opener and closer means shown in FIG. 14 comprises a reversible electric motor, 211, driving the threaded shaft, 215, of the tapered area adjustor, 212, via a gear box, 213, and a slideable splined coupling, 214, so that electric motor rotation in the increase direction increases the flow area, 209, and hence the water flow quantity entering that radiant heater, and so that electric motor rotation in the decrease direction decreases the flow area, 209, and hence the water flow quantity entering that radiant heater. The electric motor, 211, is energized from the power source, 216, either in the increase direction via the increase switch, 217, and increase limit switch, 218, or in the decrease direction via the decrease switch, 219, and decrease limit switch, 220. When tube wall temperature sensed at, 205, is above a set value the controller, 206, opens the decrease switch, 219, and closes the increase switch, 217, to increase water flow area, 209, and water flow and thus acts to decrease tube wall temperature. When tube wall temperature sensed at, 205, is below a set value the controller, 206, opens the increase switch, 217, and closes the decrease switch, 219, to decrease water flow area, 209, and water flow and thus acts to increase tube wall temperature. The limit switches, 218, 220, function to stop the electric motor, 211, before mechanical interference occurs. Other types of steam enthalpy sensors and flow distribution control means can also be used for the purposes of this invention.

The various radiant heaters and convection heaters are pressure vessels on their steam sides requiring adequate wall thickness to withstand full boiler steam pressure at operating temperatures. The containers, within which radiant heaters may be mounted, are also pressure vessels on their combustion gas sides and require adequate wall thickness to withstand the maximum reactant gas pressure applied by the compressor during compression. Convection heaters on expander inlets are also pressure vessels on their gas sides and require adequate wall thickness to withstand the maximum pressure applied by containers when connected to that particular expander inlet. These boiler heaters which are pressure vessels on both the steam side and the gas side are preferably arranged so that the gas side pressure vessel is integral with or at least in contact with the steam side pressure vessel. With this preferred integral pressure vessel, additional heat transfer area is provided to the steam side pressure vessel and cooling is provided to the gas side pressure vessel. This integral pressure vessel arrangement is shown in FIGS. 3 and 4 wherein the gas side pressure vessel wall, 54, is secured to all of the steam side pressure vessel tube walls, 53, as by welding. Commonly the radiant heater container pressure vessel walls, 54, are insulated to reduce heat loss on the side opposite the combustion chamber.

The largest fluctuation of net rate of work output occurs at each change of connectings. Just prior to the change all containers being compressed are near to full pressures for the interval and compressor work rate is maximum, whereas all containers being expanded are near to minimum pressures for the interval and expander work rate is minimum, the one expanding container about to disconnect from the expander producing essentially no work. Just after a change of connectings, all containers being compressed are at lowest pressures for the interval, the one container just connected to the lowest pressure stage of the compressor requiring essentially no work, whereas all containers being expanded are at maximum pressures for the interval and expander work rate is maximum. This largest work rate fluctuation can be approximated as equal to the sum of the maximum work rate of the lowest pressure stage of the compressor and the maximum work rate of the lowest pressure stage of the expander and clearly can be made as small as required by increasing the number of compressor stages, nc, and by increasing the number of expander stages, nx. In FIGS. 1 and 2 the number of compressor stages is shown equal to the number of expander stages but this is not necessary. An expander stage as herein defined may be a work output producing expander engine or a non work output producing blowdown expander. Additionally, these power output variations can be reduced to essentially zero by use of the devices described in my cross-referenced U.S. patent application entitled, "Torque Leveller," Ser. No. 06/403,923, filing date July 30, 1982. For example, the leveller engine can be a steam turbine using all or some of the steam generated in the cyclic Velox boiler plant.

Several control means are described herein for control of the compressor, the expander, the feedwater pump, the combustion steam, etc., and these controls are described as operating separately. In many applications we may prefer to use an integrated control system which could also include the steam turbine and electric generator controls of a steam power cycle. These various separate control means can be combined into an integrated control system by methods already well known in the art of control systems such as those described in chapter 35 of reference D.

As compression proceeds each primary air mass increment enters the char pores and reacts there into primary reacted gas, being thereafter further compressed. Hence, each reacted gas increment reacts at a different pressure and hence temperature and, being thus at a different reacted gas temperature, has a different work of compression done upon it when compressed up to the final pressure. This manner of differing compression plus reaction plus further compression produces several results:

(1). The final compressed reacted gas has a large temperature gradient since each gas mass had a different amount of work of compression done upon it.

(2) The work of compression upon the primary reacted gas in the pores and the air in the dead volume inside the container is done by the flow work of those air masses later compressed into the container.

(3) The secondary and excess air mass increments do not react during compression and hence these have equal net work of compression and no temperature gradient.

(4) Each incremental air mass, forced by the compressor into the container, divides into two portions, a primary air portion going into the char pores and a secondary and excess air portion going into the dead volume. These portions change relatively as compression proceeds due to the different "compressibilities" of those gases already inside the pores and those gases already inside the dead volume. It is the temperature gradient of the pore gases and its absence in the dead volume gases which produces this difference of "compressibility." Initially, the dead volume incremental portion is relatively the larger whereas subsequently the pore volume incremental portion increases relatively.

(5) To produce a given incremental rise in pressure inside the container, a different added mass is required into the pore volume than into the dead volume and the ratio of these two masses changes during compression. Hence, the schedule of air mass compressed versus pressure rise produced by the air compressor is different when compressing a container full of reacting char fuel as against compressing a dead volume container. This affects the work of the compressor, which is the sum of the incremental products of air mass compressed times enthalpy rise produced at the time and pressure of air mass delivery into the container.

As expansion proceeds, the pressure drop during each time increment causes an increment of primary reacted gas to leave the pore volume and to enter the dead volume where it reacts with a secondary air mass increment to produce secondary reacted gases at an even higher temperature. But these secondary reacted gases will preferably all leave the dead volume during the time increment if the same pressure drop is also to take place there. Some of the excess air in the dead volume may also have to leave during the time increment so that the pressure drop in the dead volume will equal that in the pore volume and this air will be excess air since it will not be used to react with any of the primary reacted gases. Again, due to the differing "compressibilities," or rather "expansibilities," of the pore gases from the dead volume gases, for a given pressure drop the mass increment to be removed from the pore volume changes relative to the mass increments to be removed from the dead volume as expansion proceeds. The mass increment from the pore volume is relatively larger at the start of expansion and then, as expansion proceeds, the mass increment from the dead volume increases relatively. Hence, it is preferably during the later and lower pressure parts of the expansion that the excess air leaves the dead volume. At least some excess air is thus needed in the dead volume to assure that sufficient secondary air can be removed from the dead volume as to fully burn the emerging primary reacted gases during the early part of expansion.

The manner in which the secondary reacted gases and excess air actually leave the container during expansion depends also on the location of the exit pipe relative to the char fuel mass.

(a) If the exit pipe entry port is located far away from the char fuel, and hence from where the secondary reacted gas is being formed, mostly air alone will be first to leave the container and secondary reacted gases will leave later. In this case, we are refilling the dead volume with secondary reacted gases. Here we run the risk of using up all the air in the dead volume, by early outflow and by early reaction, before expansion is complete. The last portions of primary reacted gas to leave the pores will not then find any secondary air available for their burning and unburned gas fuel losses will result, or else a large quantity of excess air will be needed producing high compressor-expander losses.

(b) If the exit pipe entry port is located too close to the char fuel, some of the primary reacted gas may leave thereby before reacting with secondary air and thus escape through the expander as an unburned fuel gas loss.

(c) Ideally, the exit pipe is located close enough to the char fuel so that all of the secondary reacted gases flow first out the exit but not so close that any primary reacted gas can escape unburned.

This ideal exit pipe entry port location may well differ at differing char burn-up rates. Hence, for some applications we may prefer several entry ports for the exit pipe and these positioned differently relative to the char fuel mass. Additionally, dampers can be placed in at least some of these several exit pipe entry ports and adjusted so as to produce the desired relative flow of fully burned secondary reacted gases and excess air. This adjustment of the exit pipe entry port dampers can be done by hand or preferably automatically in response to analysis of the exit gas content of unburned carbon monoxide gas or the content of both unburned carbon monoxide gas and oxygen gas from excess air. With automatic damper control, the dampers can be readily adjusted while each container is being expanded from maximum pressure down to final pressure. If dampers are placed in all of the exit pipe entry ports, at lest two of these dampers are preferably to be interconnected so that net total entry port area is always at least equal to that of a single entry port in order to avoid undesirable expansion gas throttling losses. These exit pipe multiple entry ports with dampers and adjustment means are a means for controlling the relative flow of gases, from the dead volume adjacent to the char fuel mass, and from the dead volume away from the char fuel mass, out of each container during expansion, so that essentially all of the primary reacted gas leaving the pore volume of the char fuel mass is essentially completely burned with secondary air, and also so that the required excess air quantity is minimized.

One example of such a means for controlling the relative flow of gases during expansion out of a container, 11, is shown schematically in FIG. 15, and comprises:
(a) an exit pipe entry port, 221, rather close to the char fuel pile, 43, and fitted with a damper valve, 223, with control lever, 225:
(b) another exit pipe entry port, 222, rather far away from the char fuel pile, 43, and fitted with a damper valve, 224, with control lever, 226;
(c) a third exit pipe entry port, 227, at an intermediate position relative to the char fuel pile, 43, and not fitted with a damper valve;
(d) a gas sample nozzle, 228, located in entry port, 221, directs a gas sample to the carbon monoxide analyzer and controller, 229, operative upon the actuator, 230, which adjusts the damper valve, 223, via its lever, 225;
(e) another gas sample nozzle, 231, located in the final exit pipe, 232, directs a gas sample to the oxygen gas analyzer and controller, 233, operative upon the actuator, 234, which adjusts the damper valve, 224, via its lever, 226.

When carbon monoxide content of the sampled gases exceeds a small set value, the controller, 229, acts via the actuator, 230, to move the damper, 223, so as to reduce the flow area of that entry port, 221, closest to the char fuel pile. When oxygen gas content of the sampled gases exceeds a set value, the controller, 233, acts via the actuator, 234, to move the dampers, 224, so as to reduce the flow area of that port, 222, farther away from the char fuel pile. The set values for carbon monoxide content and oxygen gas content can be adjusted via the knobs, 234, 236, so as to minimize plant losses due to unburned carbon monoxide on the one hand or too large an excess air quantity on the other hand. The entry ports, 221, 222, 227, may also be positioned at several angular positions around the char fuel pile, 43.

The expansion work done by the gases inside the container is delivered to the expander engine as a flow work input to the expander. The expansion work done by the primary reacted gases while within the char pores will essentially equal the compression work previously done upon these same gases during compression, provided the primary reaction of air and carbon occurs promptly when the primary air enters the pore volumes. In this way, each increment of primary reacted gas emerges from the char pores at essentially the same pressure at which it was formed when the air mass increment from which it was formed entered the char pore volume. As each increment of primary reacted gas thus emerges from the char pores, it reacts further and preferably completely with an increment of secondary air from the dead volume and the resulting secondary reacted gas mass increment then flows preferably promptly out of the container and into the expander. In addition an increment of excess air from the dead volume may also flow concurrently out of the container and into the expander. Hence, two different kinds of gases may concurrently leave the container and enter the expander with each increment of pressure decrease; a secondary reacted gas mass at very high temperature and an excess air mass at rather low temperature. The increment of expander engine work done by each of these expanding gas mass increments equals the product of their enthalpy drop across the expander, which will be much larger for the high temperature secondary reacted gas than for the colder excess air, and the separate mass increments. But as already described the relative separate mass increments also vary for different pressure drop increments during expansion. Both of these effects, the difference of enthalpy drop and the difference of relative mass increment, affect the work of the expander, which is the sum of the incremental mass times enthalpy drop products for both of the separate gases at each expansion pressure drop increment.

E. Plant Sizing

Most commonly a cyclic Velox boiler will be sized to produce a selected steam quantity at selected boiler input and output steam conditions. Preferably, measured data from pilot plant experiments are used to size the several elements of a cyclic Velox boiler. For example, the following quantities can be measured and calculated from pilot plant experiments with a carbon fuel:
(mf)=char fuel firing rate, mass per unit time
(ms)=boiler steam generation rate, mass per unit time
(mc)=carbon fuel firing rate, mass per unit time
(ma)=compressor air flow rate, mass per unit time
(mcs)=combustion steam flow rate, mass per unit time
(mx)=(ma)+(mc)+(mcs)=expander gas flow rate, mass per unit time
(hsx)=boiler outlet steam ethalpy, energy units per unit mass
(hsi)=boiler inlet feedwater enthalpy, energy units per unit mass
(LHVF)=char fuel lower heating value, energy units per unit mass
(LHVC)=carbon lower heating value, energy units per unit mass $$(LHVC) = (LHVF)\left(\frac{mf}{mc}\right)$$

a=molal combustion steam to oxygen ratio $$a = \frac{(mcs)}{(ma)} (7.63)$$

(exa)=fractional excess air $$(exa) = \frac{(ma)(12)}{(MA)(mc)(4.76)} - 1$$

The quantity, (exa), can also be measured via analysis of the expander exhaust gas.
(MA)=molecular weight of air
G=pore oxygen gas ratio, oxygen gas into char pores divided by total oxygen gas compressed into container $$G = \frac{1}{(2+a)(1+exa)} \text{ ; (approximately)}$$

RP=port volume ratio, char pore volume divided by total gas space volume inside container
RP=(VP)/(VR)
(VP)=pore volume of all active containers, volume units $$(VP) = \left(\frac{\% \text{ Pore}}{100}\right)(CGV)$$

(% Pore)=precent porosity of char fuel
(CGV)=char fuel gross volume in all active containers, volume units The quantities, exa, G, and RP can be varied during pilot plant tests in various ways, such as adjusting the height and hence the gross volume, CGV, of the char fuel.
(VR)=gas space volume in all active containers, volume units $$(VR) = (VT)\frac{(\% \text{ Pore})(1-fA)}{(fD)(\% \text{ Pore}) + (1-fD)(100)}$$

(VT)=total internal volume of all active containers, volume units
(fD)=dead gas space volume fraction not occupied by char fuel
(fA)=fraction of total volume occupied by ashes
(fD)=(1−RP)
(nc+nx)=number of active containers being compressed or expanded
(nc)=number of compressor stages
(nx)=number of expander stages
(tc)=cycle time for one container to undergo a full cycle of compression and expansion, time units $$(BF) = \left[1 + \left(\frac{QR1}{(5.76 + 2a)(2)(MB1)(CPB1)}\right)\left(1 + \frac{1}{(PR)^{\frac{k-1}{k}}}\right)\right]\left(\frac{5.76 + 2a}{4.76 + a}\right)$$

(PM)=maximum compression pressure, force per unit area
(PO)=starting compression pressure, force per unit area
(PR)=compression pressure ratio=(PM/PO)
(wca)=actual compressor work input per unit mass of air compressed, energy units per mass unit
(efc)=compressor isentropic efficiency, fractional
(wxa)=actual expander work output per unit mass of air compressed, energy units per mass unit
(efx)=expander isentropic efficiency, fractional
(wna)=net work output per unit mass of air compressed, energy units per mass unit
(wna)=(wxa)−(wca)
(efa)=work output efficiency of the compressor expander, fractional $$(efa) = \frac{(wna)(ma)}{(mc)(LHVC)}$$

(wca)(ma)=compressor power input
(wxa)(ma)=expander power output
(wna)(ma)=net power output
(TGMA)=expander maximum inlet gas temperature, absolute degrees
qB=fraction of total heat of combustion of carbon transferred to boiler steam up to the expander inlet Measurement of the value of qB requires measuring boiler steam enthalpy out of the last heaters up to the expander inlet, hsz, in addition to the boiler inlet and outlet steam enthalpies.

$$qB = \frac{(hsz - hsi)(ms)}{(mc)(LHVC)}$$

(Δwna)=change in net actual work output per unit mass of air compressed, from just before a change of gas flow connectings to just after a change of gas flow connectings
(EB)=true boiler efficiency, fractional $$(EB) = \frac{(ms)(hsx - hsi)}{(mc)(LHVC)(1 - efa)}$$

(MB1)=average molecular weight of primary burned gases inside pores
(CPB1)(MB1)—specific heat at constant pressure of primary burned gases, energy units per mol of primary gas These measured and calculated data can be more useful when graphed in dimensionless form to permit interpolation between pilot plant data points and, to some extent, extrapolation beyond the data. For example, graphs of the following would be useful for plant sizing purposes:

(a) Plot the ratio (G/1−G) against the ratio (RP/1−RP) for those preferred values of G and RP at which the least excess air, (exa), was useable without appreciable losses due to incomplete combustion. A separate graph can be drawn for each different value of the factor, BF:

wherein:
(QR1)=heat of primary reaction inside pores in energy units per mole of oxygen gas reacted in primary reaction
k=specific heats ratio (b) Plot (TGMA) against (qB). A separate graph can be drawn for each different value of (PR) and on each such graph separate lines can be drawn for each different value of (a).
(c) Plot (efa) against (PR). A separate graph can be drawn for each different value of (TGMA). For use in sizing full-scale plants, the measured values of (efa) are preferably corrected for the usually higher values of (efc) and (efx) applicable to larger plant sizes.
(d) Plot (Δwna) against (nc+nx).
(e) Plot the ratio, (mc/ms), against (EB). For use in sizing full-scale plants, the measured values of (EB) are preferably corrected for the usually higher values applicable to larger plants.
(f) Plot the ratio, (ma/mc), against (exa) for those preferred values of (exa) at which only negligible incomplete combustion losses occurred.

(g) Plot (VR/tc) against (ma). A separate graph can be drawn for each different value of (RP) and on each such graph separate lines can be drawn for each different value of (PR). The value of (a) also somewhat affects these lines.

From the foregoing measured pilot plant data and graphical results, a cyclic Velox boiler plant can be sized to meet any desired boiler steam generation capacity and steam condition. Alternatively, the cyclic Velox boiler plant can be sized to meet other capacity criteria, such as a desired value of net power output, (wna)(ma), form the compressor-expander unit, using these same data and graphs. For any particular desired capacity, several different plant designs can be used depending upon the values selected for various plant operating conditions of which the following are important:

(1) Increased values of compression pressure ratio, (PR), yield higher values of work output efficiency, efa, of the compressor-expander unit, but require stronger containers and higher pressure compressors and expanders and these are more expensive.

(2) Increased compressor inlet air density, by increase of inlet pressure, (PO), and/or by decrease of inlet temperature, (TO), increases air flow rate, ma, carbon burn rate, mc, steam generation rate, ms, and net power output, (wna)(ma), of the compressor-expander unit, Usually, these effects will be utilized to control plant capacity by control of compressor inlet air density as described hereinabove.

(3) Increased maximum expander gas inlet temperature, (TGMA), increases net power output, (wna)(ma), and work efficiency, (efa), of the compressor expander unit, but requires use of more expensive expander materials in the expander engine or shortens the useful life of the expander.

(4) Changing the value of combustion steam to oxygen ratio, a, at least moderately affects all of the plant operating conditions, one of the principal effects being an increase of convective heat transfer and a decrease of radiation heat transfer to the boiler as (a) is increased. This heat transfer effect can be utilized for steam superheater and reheater control as described hereinabove.

(5) For any particular plant capacity and operating conditions, a particular value of the ratio, (VR/tc), is required. But several different values of (VR) and (tc) can be used for any one value of this ratio. Larger values of container volume, (VT), and hence of gas space volume, (VR), may yield higher values of boiler efficiency, (EB), since a greater radiation heat transfer area results.

(6) Increasing the number of active containers, (nc+nx), by increase of the number of compressor and/or expander stages, will decrease the variation of net power output, ($\Delta$wna)(ma), but will increase the plant cost. The radiation heat transfer area and hence the boiler efficiency, (EB), can also be increased by increase of the number of active containers.

The refuel and coke removal mechanisms are sized to deliver at least the maximum carbon fuel flow rate, mc, and to remove the corresponding ash flow rate. The following relations can be utilized for this sizing of the refuel and coke removal mechanisms:

$$(mc) = \frac{(VF)(dch)(\% \text{ carb.})}{(tf)(100)}$$

$$(tf) = \frac{(tc)}{(nc + nx)} Z -$$

(tf) = refuel time interval between refuelings of all active containers, time units
(VF) = refuel volume of each refuel mechanism, volume units
(dch) = char fuel density, mass per unit volume
(% carb.) = percent carbon content of char fuel
Z = refuel ratio, any integar equal to or greater than 1.0
(mr) = mass flow rate of ashes per unit time $$(mr) = \frac{(VC)(dchr)}{(tfr)} = (mf)\left(\frac{\% \text{ ash}}{100}\right)$$

$$(mr) = (mc)\left(\frac{\% \text{ ash}}{\% \text{ carb}}\right)$$

$$(tfr) = \frac{(tc)}{(nc + nx)} y$$

(tfr) = coke removal time interval between removals of ashes from all active containers, time units
(VC) = removal volume of each coke removal mechanism, volume units
(dchr) = ash density, mass per unit volume
(% ash) = percent ash content of char fuel
y = coke removal ratio, any integer equal to or greater than 1.0

Any consistent system of units can be used for the various measured and calculated quantities described above.

The foregoing pilot plant data method for sizing a cyclic Velox boiler plant is preferred. For those cases where pilot plant data are inadequate or unavailable, the following additional analytical equations can be used for approximate plant sizing calculations:

$$\frac{(mc)}{(ms)} = \frac{(hsx - hsi)}{(EB)(1 - efa)(LHVC)}$$

$$\frac{(ma)}{(mc)} = \frac{137.3}{12(G)(2 + a)}$$

$$\frac{(mcs)}{(ma)} = \frac{18a}{137.3}$$

$$(mx) = (ma) + (mc) + (mcs)$$

$$(G) = \frac{1}{(2 + a)(1 + exa)}$$

$$\left(\frac{G}{1-G}\right) = \left(\frac{RP}{1-RP}\right)\left(\frac{4.76 + a}{5.76 + 2a}\right)\left(\frac{TM}{TP}\right)$$

(TM) = average gas temperature in dead volume at end of compression
(TP) = average primary burned gas temperature inside pores at end of compression $$\left(\frac{TM}{TP}\right) =$$

$$0.88\left[1 + \frac{QR1}{(5.76 + 2a)2(MB1)(CPB1)(TO)}\left(1 + \frac{1}{(PR)^{\frac{k-1}{k}}}\right)\right]$$

-continued $$(ma) = \left(\frac{VR}{tc}\right)[(RP)(FP) + (1 - RP)(FD)]$$

(FP) = pore gas compression factor $$(FP) = \frac{(PO)(SPM)(4.76)(MA)}{k(RB1)(TO)(5.76 + 2a)(MB1)}$$

$$(SPM) = \frac{(33.5)(5.76 + 2a)(MB1)(CPB1)(TO)(PM - PO)}{[QR1 + 2(5.76 + 2a)(MB1)(CPB1)(TO)](PB - PA)}$$

(PB) = high reference pressure, equivalent to 34 atmospheres (PA) = low reference pressure, equivalent to one atmosphere (FD) = dead gas compression factor $$(FD) = \frac{(PO)\left[(PR)^{\frac{1}{k}} - 1\right](4.76)(MA)[1 + a + (2 + a)(exa)]}{(RAS)(TO)\{4.76[1 + a + (2 + a)(exa)] + a(1 + a) + (a)(2 + a)(exa)\}(MAS)}$$

(RAS) = perfect gas constant for mixture of combustion steam and air (MAS) = average molecular weight of the mixture of combustion steam and air (wci) = isentropic compressor work input per unit mass of air compressed, energy units per mass unit (wxi) = isentropic expander work output per unit mass of air compressed, energy units per mass unit $$(wci) = (A)(B) + (C)(D)$$

$$(wxi) = (E)(B + H) + (I)(D)$$

$$(A) = \frac{(k)(RA)(TO)}{(2 + a)(1 + exa)(k - 1)(PM - PO)}$$

$$(B) = \frac{k\left[(PM)^{\frac{2k-1}{k}} - (PO)^{\frac{2k-1}{k}}\right]}{(2k - 1)(PO)^{\frac{k-1}{k}}} - (PM - PO)$$

$$(C) = \frac{(1 - G)(k)(RA)(TO)}{(G)(k - 1)PO\left[(PR)^{\frac{1}{k}} - 1\right](2 + a)(1 + exa)}$$

$$(D) = (PM - PO) - k(PO)^{\frac{k-1}{k}}\left[(PM)^{\frac{1}{k}} - (PO)^{\frac{1}{k}}\right]$$

$$(E) = \frac{(rb2)(MB2)(k)(RB2)(TO)}{(2 + a)(1 - exa)(4.76)(MA)(k - 1)(PM - PO)}$$

(MB2) = average molecular weight of secondary reacted gases (MB2)(CPB2) = specific heat at constant pressure of secondary reacted gases per mol of gas (rb2) = 9.52 + 5.76a + (1+a)(a) + (2+a)(exa)(4.76+a)

$$(H) = \left(\frac{\Delta TRB}{TO}\right)(D)$$

ΔTRB = total gas temperature rise of secondary reacted gases due to both primary reaction and secondary reaction $$(I) = \frac{(exa)(2+a)(1-G)(k)(RA)(TO)}{(2+a)(1+exa)[(+a)(exa)(2+a)](G)(k-1)(PO)\left[(PR)^{\frac{1}{k}} - 1\right]}$$

$$(\Delta TRB) = \frac{(2+a)(QRC)(1-qB)}{(rb2)(CPB2)(MB2)}$$

(2+a)(QRC) = heat of reaction of carbon burning to carbon dioxide, energy units per mol of oxygen gas reacted (wca) = (wci)/(efc)
(wxa) = (efx)(wci)
(wna) = (wxa) = (wca)
(efa) = (wna)/(qin)

$$(qin) = \frac{(2 + a)(QRC)}{(MA)[9.52 + 4.76a + (2 + a)(exa)(4.76)]}$$

The variation of work output, (Δwna), occurring when the changeable gas flow connections are changed can be estimated as follows:

(a) calculate (wca max) and (wxa max) at the true maximum pressure of compression;

(b) calculate (wcamin) at the maximum pressure reached by the next to last container being compressed;

(c) calculate (wxamin) at the starting pressure of the second container being expanded;

(d) calculate estimated (Δwna);

Δwna = (wxamax − wxamin) − (wcamin − wcamax)

The least amount of excess air, examin, to always assure at least stoichiometric flow of secondary air from the dead volume relative to pore gas flow from the pore volume during expansion can be estimated as follows:

$$(examin) = \left[\frac{k(PM)}{(PM - PO)} - 1\right]\left(\frac{1 + a}{2 + a}\right)$$

$$(TGMA) = (TO)(PR)^{\frac{k-1}{k}} + (\Delta TRB)$$

Select value of (qB) to yield desired value of (TGMA).

Again, any consistent system of units can be used for these additional analytical sizing equations.

These analytical sizing equations suffer the errors inherent in the assumptions and approximations made for their derivation of which the follow are the more important:

(1) all processes assumed isentropic except the primary and secondary chemical reactions;

(2) gases behave as perfect gases with constant specific heats;

(3) heat of reaction constant;

(4) combustion steam and air are not stratified;

(5) primary and secondary reactions occur essentially instantaneously upon contact of reactants;

(6) secondary reaction products flow promptly out of containers after reaction;

(7) primary and secondary reactions go to completion.

These assumptions will tend to cause the calculated work output and efficiency of the compressor-expander unit to be too high.

Various examples of cyclic Velox boiler plants and elements thereof have been described hereinabove for purposes of illustration, but it is not intended thereby to limit the invention to these illustrative examples.

Having thus described my invention, what I claim is:

1. The combination of a cyclic oxidation char gasifier plant comprising:

at least one compressor means for compressing gases from a lower pressure to a higher pressure and each such compressor means comprising at least one stage and each such stage comprising an inlet and an outlet end;

at least one expander means for expanding gas from a higher pressure to a lower pressure and each such expander means comprising at least one stage and each such stage comprising an inlet end and a discharge end;

at least two separate containers, each of said containers comprising pressure vessel means for containing char fuel and any gas compressed into said char fuel, each such container comprising interior surfaces on the combustion side;

power means for driving said compressors and for absorbing any mechanical work done upon said expanders by said expanding gas;

each such expander means comprising an expander discharge;

at least one char fuel heater, said char fuel heater comprising means for heating a portion of the char fuel within each of said containing means to that temperature at which said char will react rapidly with oxygen in adjacent compressed reactant gases when said cyclic char gasifier plant is being started;

at least one reactant gas supply source of gas containing appreciable oxygen gas;

each such compressor whose number of stages exceeds one further comprising fixed open gas flow connections from the outlet end of each compressor stage, except one, to the inlet end of one other stage of said compressor, whereby said stages of said compressor are connected in series so that the pressure of a particular gas means, at delivery from each stage, increases as said gas mass is compressed through said series connected stages, from the inlet end to the outlet end of each stage, with the first stage in said series through which a gas mass first flows being both the lowest pressure stage and also that one stage whose inlet end does not have a fixed open gas flow connection from the outlet end of any other stage of said compressor, and with the last stage in said series through which a gas mass last flows being both the highest pressure stage and also that one stage whose outlet end does not have a fixed open gas flow connection to the supply end of any other stage of said compressor;

fixed open gas flow connections from the inlet end of the lowest pressure stage of each of said compressors to at least one reactant gas supply source of gas containing appreciable oxygen gas;

each such expander whose number of stages exceeds one further comprising fixed open gas flow connections from the discharge end of each expander stage, except one, to the inlet end of one other stage of said expander, whereby said stages of said expander are connected in series so that the pressure of a particular gas mass, at discharge from each stage, decreases as said gas mass is expanded through said series connected stages, from the inlet end to the discharge end of each stage, with the first stage in said series through which a gas mass first flows being both the highest pressure stage and also that one stage whose inlet end does not have a fixed open gas flow connection from the discharge end of any other stage of said expander, and with the last stage in said series through which a gas mass last flows being both the lowest pressure stage and also that one stage whose discharge end does not have a fixed open gas flow connection to the inlet end of any other stage of said expander;

fixed open gas flow connections from the discharge end of the lowest pressure stage of each of said expanders to said expander discharge;

changeable gas flow connections, which are openable and closeable, from each of said containers to each outlet end of each stage of each of said compressors and to each inlet end of each stage of each of said expanders;

each cyclic char gasifier plant comprising a number of said containers, with changeable gas flow connections to said compressors and to said expanders, at least equal to the sum of the number of comressor stages of all compressors, and the number of expander stages of all expanders;

at least one refuel mechanism, said refuel mechanism comprising;

means for transferring a volume of solid materials from a supply source into said containing means when said refuel transfer means is connected to said containing means;

means for connecting said refuel transfer means to said containing means for a time period for refueling and for disconnecting said refuel transfer means from said containing means at the end of said refuel time period;

means for sealing said refuel means for connecting and disconnecting against gas leakage;

at least one coke removal mechanism, said coke removal mechanism comprising;

means for transferring a volume of non-gas materials out of said containing means;

means for opening and closing said changeable gas flow connections so that each container is opened for a time period to each outlet end of each stage of each of said compressors, in a sub-sequence of time periods of open gas flow connections to compressors, said sub-sequence proceeding in time order of increasing compressor stage delivery pressure, and is opened for a time period to each inlet end of each stage of each of said expanders, in a sub-sequence of time periods of open gas flow connections to expanders, said sub-sequence proceeding in time order of decreasing expander stage inlet pressure, said sub-sequence of connections to said compressors being followed by said sub-sequence of connections to said expanders, and these together comprise one sequence of time periods of open gas flow connections, each of said containers is opened to only one stage during any one time period of said sequence of time periods, said sequence of time periods of open gas flow connections to said compressors and to said expanders is repeated for each of said containers by said means for opening and closing;

means for controlling said means for opening and closing, and said means for connecting said refuel transfer means and said coke removal transfer means, so that said repeated sequences of time periods of open gas flow connections, and any time periods available only for refueling and for coke removal, are a continuous series of time periods for any one containing means, and so that the delivery end of each stage of each compressor has an open gas flow connection to one containing means, and the inlet end of each stage of each expander has an open gas flow connection to one containing means, during all time periods, whenever said plant is operating;

wherein the improvement comprises adding thereto:

boiler means for heating and boiling liquid water at pressure and for heating steam at pressure, and comprising a boiler feedwater inlet and a boiler steam outlet, at least one portion of said boiler means comprising at least one radiant heater means positioned on the interior surfaces of one of said containers, each such radiant heater comprising a liquid water inlet and a water outlet;

a source of boiler feedwater;

feedwater pumping means for pumping liquid water into said boiler means from said feedwater supply source and comprising a drive means for driving said feedwater pump and a control means for controlling the flow rate of water pumped;

feedwater pump connecting means for connecting said feedwater pumping means to said boiler means and to said feedwater supply source so that liquid water is forced into said boiler liquid water inlet whenever said plant is operating;

sensor and control means for sensing the quantity of char fuel within each said container when said plant is operating and operative upon said means for connecting said refuel transfer means so that, when the volume of char fuel within any one container becomes less than a minimum set value, said refuel transfer means is connected to that container by said means for connecting said refuel means, and when the volume of char fuel within any one said container exceeds a maximum set value, said refuel transfer means is disconnected from that container by said means for connecting said refuel means;

whereby said cyclic oxidation char gasifier plant becomes a cyclic Velox boiler plant.

2. The combination of a cyclic Velox boiler plant as described in claim 1, wherein:

said boiler means comprises at least two of said radiant heater means;

and further comprising:

series connecting means for connecting said several boiler radiant heater means in series so that all of the water which flows through any one of said radiant heater means also flows through all of said radiant heater means whenever said series connecting means remains unchanged.

3. The combination of a cyclic Velox boiler plant as described in claim 1, wherein:

said boiler means comprises at least two of said radiant heater means;

and further comprising:

changeable water flow connecting means for connecting the liquid water inlet of each said radiant heater means to said boiler feedwater inlet, and the water outlet of each said radiant heater means to said boiler steam outlet, and said radiant heater liquid water inlets to said radiant heater water outlets of different said radiant heater means;

means for opening and closing said changeable water flow connecting means;

and further wherein said means for controlling said means for opening and closing said changeable gas flow connecting means additionally controls said means for opening and closing said changeable water flow connecting means so that water flows through said several radiant heater means in series, and so that during any one time period the water flow direction is in order, through those radiant heaters inside containers connected to compressor stages and in the direction of increasing compressor stage delivery pressure, and then through those radiant heaters inside containers connected to expander stages and in the direction of increasing expander stage inlet pressure.

4. The combination of a cyclic Velox boiler plant as described in claim 1, wherein:

said boiler means comprises at least two of said radiant heater means;

and further comprising:

parallel connecting means for connecting said several boiler radiant heater means in parallel so that said several radiant heater means have a common liquid water inlet and a common water outlet;

flow distribution means for distributing water flow to said several radiant heater means so that, said water flow is distributed between said several parallel connected boiler radiant heater means with at least some water being always distributed to each said radiant heater means, said flow distribution means connecting between said common liquid water inlet and the separate liquid water inlets of each said radiant heater.

5. The combination of a cyclic Velox boiler plant as described in claim 4 and further comprising:

steam enthalpy sensor means for separately sensing the enthalpy of water leaving each of said several radiant heater means;

control means responsive to said several separate steam enthalpy sensor means and operative upon said flow distribution means for distributing water flow so that said water flow is distributed to each radiant heater means so that the water leaving any one of said radiant heater means has approximately the same enthalpy as the water leaving any other one of said radiant heater means.

6. The combination of a cyclic Velox boiler plant as described in claim 1, 2, 3, 4, or 5 and further comprising:

at least one convection heating means for heating water at pressure by means of the combustion gases flowing into the inlet of one of said expander stages and comprising a convection heater water inlet, a convection heater water outlet, a steam side, and a gas side;

convection heater steam side connecting means for connecting said convection heating means into said boiler means so that at least some of the water which flows through said radiant heater means flows through the steam side of at least one of said convection heater means;

convection heater gas side connecting means for connecting each of said convection heating means into the inlet of one stage of one of said expanders so that all of the combustion gases which flow from connected containers into the inlet of that stage of that expander flow previously through the gas side of that connected convection heating means.

7. The combination of a cyclic Velox boiler plant as described in claim 1, 2, 3, 4, or 5, and further comprising:
at least one expander exhaust gas means for heating water at pressure by means of the combustion gases flowing through the discharge of at least one of said expanders and comprising an exhaust heater means water inlet, an exhaust heater means water outlet, a steam side and a gas side;
exhaust gas heater steam side connecting means for connecting each said exhaust gas heater into said boiler means so that at least some of the water which flows through said radiant heater means also flows through the steam side of each said exhaust gas heater means;
exhaust gas heater gas side connecting means for connecting each said exhaust gas heater into the discharge of at least one of said expanders so that all of the combustion gases which flow through said connected expanders flow subsequently through the gas side of each said exhaust gas heater means.

8. The combination of a cyclic Velox boiler plant as described in claim 1, 2, 3, 4, or 5 and further comprising:
at least one convection heating means for heating water at pressure by means of the combustion gases flowing into the inlet of one of said expander stages and comprising a convection heater water inlet, a convection heater water outlet, a steam side and a gas side;
convection heater steam side connecting means for connecting said convection heating means into said boiler means so that at least some of the water which flows through said radiant heater means also flows through the steam side of at least one of said convection heater means;
convection heater gas side connecting means for connecting each of said convection heating means into the inlet of one stage of one of said expanders so that all of the combustion gases which flow from connected containers into the inlet of that stage of that expander flow previously through the gas side of that connected convection heating means;
at least one expander exhaust gas means for heating water at pressure by means of the combustion gases flowing through the discharge of at least one of said expanders and comprising an exhaust heater means water inlet, an exhaust heater means water outlet, a steam side and a gas side;
exhaust gas heater steam side connecting means for connecting each said exhaust gas heater into said boiler means so that at least some of the water which flows through said radiant heater means also flows through the steam side of each said exhaust gas heater means;
exhaust gas heater gas side connecting means for connecting each said exhaust gas heater into the discharge of at least one of said expanders so that all of the combustion gases which flow through said connected expanders flow subsequently through the gas side of each said exhaust gas heater means.

9. The combination of a cyclic Velox boiler plant as described in claim 1, 2, 3, 4, or 5, and further comprising:
means for setting the density of the gas at inlet to said first stage of said compressor means and comprising a gas inlet and a gas outlet;
means for connecting said gas density setting means outlet to said first compressor stage inlet and said air density setting means inlet to said source of gas containing appreciable oxygen gas;
boiler pressure control means for controlling boiler steam pressure by controlling the gas density at first compressor stage inlet and comprising, a boiler steam pressure sensor and control means operative upon said means for setting the density of gas at first compressor stage inlet so that when boiler steam pressure decreases below a set value, said gas density increases and when boiler steam pressure increases above a set value, said gas density decreases.

10. The combination of a cyclic Velox boiler as described in claim 1, 2, 3, 4, or 5, and further comprising:
a source of steam for combustion steam;
means for delivering steam from said source of combustion steam into at least one container while said containers are connected to compressor stages outlets;
means for setting the flow rate of combustion steam into said containers during compression so that the ratio of combustion steam flow rate to gas flow rate into each container essentially equals a set value at each container pressure;
at least one convection superheater means for heating steam at pressure by means of the combustion gases flowing into the inlet of one of said expander stages and comprising a superheater steam inlet, a superheated steam outlet, a steam side and a gas side;
superheater steam side connecting means for connecting said superheater means to said boiler means so that said boiler steam outlet connects to said superheater steam inlet;
superheater gas side connecting means for connecting each said superheater means into the inlet of one stage of said expander so that all of the combustion gases which flow from connected containers into the inlet of that stage of said expander flow previously through the gas side of said superheater means;
superheat control means for controlling the steam temperature at superheated steam outlet by controlling the set values of the ratio of combustion steam to gas compressed into said containers so that, when superheated steam temperature decreases below a set value, said set values of the ratio of combustion steam to gas increase, and when superheated steam temperature increases above a set value, said set values of the ratio of combustion steam to gas decrease, said superheat control means comprising a temperature sensor means for sensing steam temperature at said superheated steam outlet and control means operative upon said combustion steam flow rate setting means.

11. The combination of a cyclic Velox boiler as described in claim 8 wherein the number of said radiant heater means equals the number of said containers and further comprising:
means for setting the density of the gas at inlet to said first stage of said compressor means and comprising a gas inlet and a gas outlet;
means for connecting said air density setting means outlet to said first compressor stage inlet and said air density setting means inlet to said source of gas containing appreciable oxygen gas;
boiler pressure control means for controlling boiler steam pressure by controlling the gas density at first compressor stage inlet and comprising, a boiler steam pressure sensor and control means operative upon said means for setting the density of gas at first compressor stage inlet so that when boiler steam pressure decreases below a set value, said gas density increases and when boiler steam pressure increases above a set value, said gas density decreases;

a source of steam for combustion steam;

means for delivering steam from said source of combustion steam into at least one container while said containers are connected to compressor stages outlets;

means for setting the flow rate of combustion steam into said containers during compression so that the ratio of combustion steam flow rate to gas flow rate into each container essentially equals a set value at each container pressure;

at least one convection superheater means for heating steam at pressure by means of the combustion gases flowing into the inlet of one of said expander stages and comprising a superheater steam inlet, a superheated steam outlet, a steam side and a gas side;

superheater steam side connecting means for connecting said superheater means to said boiler means so that said boiler steam outlet connects to said superheater steam inlet;

superheater gas side connecting means for connecting each said superheater means into the inlet of one stage of said expander so that all of the combustion gases which flow from connected containers into the inlet of that stage of said expander flow previously through the gas side of said superheater means;

superheat control means for controlling the steam temperature at superheated steam outlet by controlling the set values of the ratio of combustion steam to gas compressed into said containers so that, when superheated steam temperature decreases below a set value, said set values of the ratio of combustion steam to gas increase, and when superheated steam temperature increases above a set value, said set values of the ratio of combustion steam to gas decrease, said superheat control means comprising a temperature sensor means for sensing steam temperature at said superheated steam outlet and control means operative upon said combustion steam flow rate setting means.

12. The combination of a cyclic Velox boiler plant is described in claim 1, 2, 3, 4, or 5, wherein said coke removal transfer means transfers a volume of non-gas materials out of said containing means only when connected to said container, and further comprising:

means for connecting said coke removal transfer means to said containing means for a time period for coke removal and for disconnecting said coke removal transfer means from said containing means at the end of said coke removal time period;

means for sealing said coke removal transfer means for connecting and disconnecting against gas leakage;

sensor and control means for sensing the quantity of ashes within each said container when said plant is operating and operative upon said means for connecting said coke removal transfer means so that, when the volume of ashes within any one said container exceeds a maximum set value, said coke removal transfer means is connected to that container by said means for connecting said coke removal transfer means, and when the volume of ashes within any one said container becomes less than a minimum set value, said coke removal transfer means is disconnected from that container by said means for connecting said coke removal transfer means.

13. The combination of a cyclic Velox boiler plant as described in claim 1 wherein:

said boiler means comprises at least two of said radiant heater means;

said boiler means comprises a steam and liquid water separator means with an inlet, a steam outlet and a liquid water outlet;

said boiler means comprises a recirculator means with an inlet and an outlet;

and further comprising:

parallel connecting means for connecting said several boiler radiant heater means in parallel so that said several radiant heater means have a common liquid water inlet and a common water outlet;

flow distribution means for distributing water flow to said several radiant heater means so that said water flow is distributed essentially equally between said several parallel connected boiler radiant heater means, said flow distribution means connecting between said common liquid water inlet and the separate liquid water inlets of each said radiant heater;

and further wherein said boiler means comprises connecting means for connecting said common water outlet of said radiant heaters to the inlet of said steam separator and the liquid water outlet of said steam separator to the inlet of said recirculator means and the steam outlet of said steam separator to the boiler means water outlet;

and further wherein said boiler means further comprises recirculator connecting means for connecting said recirculator means outlet to said boiler means so that the liquid water recirculated by said recirculator means flows through said several parallel connected radiant heaters.

14. The combination of a cyclic Velox boiler plant as described in claim 1, 2, 3, 4, or 5, and further comprising:

means for controlling the relative flow of gases, from a dead volume adjacent to the char fuel mass, and from the dead volume away from the char fuel mass, out of each container during expansion, so that the quantity of unburned carbon monoxide gas is minimized, and so that the quantity of unreacted oxygen gas is minimized.

* * * * *

UNITED STATES PATENT AND TRADEMARK OFFICE
CERTIFICATE OF CORRECTION

PATENT NO. : 4,455,837  Page 1 of 2
DATED : June 26, 1984
INVENTOR(S) : Joseph C. Firey It is certified that error appears in the above-identified patent and that said Letters Patent is hereby corrected as shown below:

Col. 4 line 59: change, "conbined," to, -- combined --
Col. 5 line 49: change, "cycle," to, -- cyclic --
Col. 6 line 40: add an arrow after $3.76Nz$, -- $\longrightarrow$ --
Col. 6 line 51: change, "$O(1+a)O_2$," to, -- $(1+a)O_2$ --
Col. 13 line 26: change, "so," to -- as --
Col. 14 line 28: change, "to," to -- the --
Col. 15 line 33: add -- 39 -- between 38 and 40
Col. 24 line 45: change, "of," to -- to --
Col. 25 line 9: change, "surfaces," to -- sources --
Col. 42 line 67: change, "lest," to -- least --
Col. 45 line 5: change, "port," to -- pore --
Col. 45 line 15: change, "precent," to -- percent --
Col. 47 line 12: change, "form," to -- from --
Col. 48 line 11: change, "integar," to -- integer --
*Col. 49 line 54: change, "(1-exa)," to -- (1+exa) --
Col. 50 line: change, "[(+a)(exa)(2+a)]", to -- [(1+a)+(exa)(2+a)] --

UNITED STATES PATENT AND TRADEMARK OFFICE
CERTIFICATE OF CORRECTION

PATENT NO. :   4,455,837                          Page 2 of 2
DATED      :   June 26, 1984
INVENTOR(S) :  Joseph C. Firey It is certified that error appears in the above-identified patent and that said Letters Patent is hereby corrected as shown below:

Col. 50 line 15:  change, "(wxa)=(wca)", to -- (wxa)-(wca) --
Col. 50 line 25:  add a square bracket, ], at end of term
    [9.52+4.76a+(2+a)(exa)(4.76)] --
Col. 51 line 46:  change, "means," to -- mass --

Signed and Sealed this

Thirtieth Day of October 1984

[SEAL]

Attest:

GERALD J. MOSSINGHOFF

Attesting Officer       Commissioner of Patents and Trademarks